US009894011B2

(12) United States Patent
Weaver et al.

(10) Patent No.: US 9,894,011 B2
(45) Date of Patent: *Feb. 13, 2018

(54) METHODS, SYSTEMS, AND DEVICES FOR BANDWIDTH CONSERVATION

(71) Applicant: AT&T Intellectual Property I, L.P., Atlanta, GA (US)

(72) Inventors: Timothy H. Weaver, Alpharetta, GA (US); Albert Whited, Atlanta, GA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/886,380

(22) Filed: Oct. 19, 2015

(65) Prior Publication Data

US 2016/0043964 A1    Feb. 11, 2016

Related U.S. Application Data

(63) Continuation of application No. 14/193,652, filed on Feb. 28, 2014, now Pat. No. 9,166,898, which is a
(Continued)

(51) Int. Cl.
*H04N 7/16* (2011.01)
*H04L 12/927* (2013.01)
(Continued)

(52) U.S. Cl.
CPC .......... *H04L 47/80* (2013.01); *H04L 43/0882* (2013.01); *H04N 7/17318* (2013.01);
(Continued)

(58) Field of Classification Search
CPC ......... H04N 21/44218; H04N 21/6373; H04N 21/6377; H04N 21/658; H04N 7/17318; H04L 43/0882; H04L 47/80
(Continued)

(56) References Cited

U.S. PATENT DOCUMENTS 4,017,676 A    4/1977   Rabeler et al.
4,380,687 A    4/1983   Stewart
(Continued)

FOREIGN PATENT DOCUMENTS

WO    2003058478 A1    7/2003
WO    2005076617 A1    8/2005

OTHER PUBLICATIONS

"Baggage Direct—Uses Tag-It, The World's First RFID-based Baggage Delivery System", Nov. 2000, Texas Instruments, 12 pages.
(Continued)

*Primary Examiner* — Brian T Pendleton
*Assistant Examiner* — Alan Luong
(74) *Attorney, Agent, or Firm* — Cantor Colburn LLP

(57) ABSTRACT

Aspects of bandwidth conservation include monitoring, via a processor over a period of time, program state information for content streamed to an electronic device, and accumulating, in a memory device via the processor, inputs received over the period of time from a user of the electronic device. Each of the inputs is correlated to the program state information based on a location in the content at which the corresponding input occurred. Aspects further include identifying patterns of user behavior based on collective correlations between the inputs and the program state information, determining from the patterns a presence or absence of the user at the electronic device with respect to currently streamed content when no inputs are received by the user, and performing a bandwidth control operation with respect to the currently streamed content based on the determined presence or absence of the user.

17 Claims, 18 Drawing Sheets

Related U.S. Application Data continuation of application No. 11/298,402, filed on Dec. 9, 2005, now Pat. No. 8,701,148.

(60) Provisional application No. 60/713,487, filed on Sep. 1, 2005.

(51) Int. Cl.
| | |
|---|---|
| *H04H 60/32* | (2008.01) |
| *H04N 7/173* | (2011.01) |
| *H04N 21/442* | (2011.01) |
| *H04N 21/6373* | (2011.01) |
| *H04N 21/6377* | (2011.01) |
| *H04N 21/658* | (2011.01) |
| *H04L 12/26* | (2006.01) |

(52) U.S. Cl.
CPC ... *H04N 21/44218* (2013.01); *H04N 21/6373* (2013.01); *H04N 21/6377* (2013.01); *H04N 21/658* (2013.01)

(58) Field of Classification Search
USPC ...................................... 725/14, 95; 709/226
See application file for complete search history.

(56) References Cited

U.S. PATENT DOCUMENTS

| | | | |
|---|---|---|---|
| 4,439,784 A | 3/1984 | Furukawa et al. | |
| 4,769,697 A | 9/1988 | Gilley et al. | |
| 4,802,022 A | 1/1989 | Harada | |
| 4,903,130 A | 2/1990 | Kitagawa et al. | |
| 4,907,079 A | 3/1990 | Turner et al. | |
| 5,255,180 A | 10/1993 | Shinoda et al. | |
| 5,278,654 A | 1/1994 | Yang | |
| 5,313,282 A | 5/1994 | Hayashi | |
| 5,331,354 A | 7/1994 | Koyama et al. | |
| 5,731,764 A | 3/1998 | Tanaka | |
| 5,765,205 A | 6/1998 | Breslau et al. | |
| 5,793,409 A | 8/1998 | Tetsumura | |
| 5,844,600 A | 12/1998 | Kerr | |
| 5,874,986 A | 2/1999 | Gibbon et al. | |
| 5,892,856 A | 4/1999 | Cooper et al. | |
| 5,892,859 A | 4/1999 | Grote | |
| 5,995,153 A | 11/1999 | Moeller et al. | |
| 6,014,694 A | 1/2000 | Aharoni et al. | |
| 6,025,869 A | 2/2000 | Stas et al. | |
| 6,052,734 A | 4/2000 | Ito et al. | |
| 6,057,872 A | 5/2000 | Candelore | |
| 6,060,994 A | 5/2000 | Chen | |
| 6,078,589 A | 6/2000 | Kuechler | |
| 6,147,992 A | 11/2000 | Giroir et al. | |
| 6,177,931 B1 | 1/2001 | Alexander et al. | |
| 6,216,956 B1 | 4/2001 | Ehlers et al. | |
| 6,237,022 B1 | 5/2001 | Bruck et al. | |
| 6,240,460 B1 | 5/2001 | Mitsutake et al. | |
| 6,260,111 B1 | 7/2001 | Craig et al. | |
| 6,315,668 B1 | 11/2001 | Metke et al. | |
| 6,324,182 B1 | 11/2001 | Burns et al. | |
| 6,400,687 B1 | 6/2002 | Davison et al. | |
| 6,480,753 B1 | 11/2002 | Calder et al. | |
| 6,591,423 B1 | 7/2003 | Campbell | |
| 6,594,826 B1 | 7/2003 | Rao et al. | |
| 6,609,253 B1 | 8/2003 | Swix et al. | |
| 6,631,118 B1 | 10/2003 | Jones | |
| 6,647,411 B2 | 11/2003 | Towell et al. | |
| 6,717,507 B1 | 4/2004 | Bayley et al. | |
| 6,741,563 B2 | 5/2004 | Packer | |
| 6,757,796 B1 | 6/2004 | Hoffman | |
| 6,771,661 B1 | 8/2004 | Chawla et al. | |
| 6,796,787 B2 | 9/2004 | Okada | |
| 6,810,528 B1 | 10/2004 | Chatani | |
| 6,816,903 B1 | 11/2004 | Rakoshitz et al. | |
| 6,839,052 B1 | 1/2005 | Kramer | |
| 6,870,463 B2 | 3/2005 | Dresti et al. | |
| 6,889,382 B1 | 5/2005 | Anderson | |
| 6,961,341 B1 | 11/2005 | Krishnan | |
| 6,973,066 B2 | 12/2005 | Gutowski | |
| 7,000,246 B1 | 2/2006 | Takao | |
| 7,065,586 B2 | 6/2006 | Ruttenberg et al. | |
| 7,151,939 B2 | 12/2006 | Sheynblat | |
| 7,277,894 B2 | 10/2007 | Kondo et al. | |
| 7,277,897 B2 | 10/2007 | Kondo et al. | |
| 7,284,201 B2 | 10/2007 | Cohen-Solal | |
| 7,437,073 B2 | 10/2008 | Kim et al. | |
| 7,512,650 B2 | 3/2009 | Richardson | |
| 7,519,703 B1 | 4/2009 | Stuart et al. | |
| 7,975,283 B2 | 7/2011 | Bedingfield, Sr. | |
| 8,230,461 B1 | 7/2012 | Ledermann et al. | |
| 8,259,861 B2 | 9/2012 | Kuhtz | |
| 2001/0017705 A1 | 8/2001 | Hashizume et al. | |
| 2001/0031633 A1 | 10/2001 | Tuomela et al. | |
| 2001/0043571 A1 | 11/2001 | Jang et al. | |
| 2002/0002708 A1 | 1/2002 | Arye | |
| 2002/0018645 A1 | 2/2002 | Nakamatsu et al. | |
| 2002/0046099 A1 | 4/2002 | Frengut et al. | |
| 2002/0080721 A1 | 6/2002 | Tobagi et al. | |
| 2002/0083443 A1* | 6/2002 | Eldering ............... G06Q 30/02 |
| | | | 725/34 |
| 2002/0104087 A1 | 8/2002 | Schaffer et al. | |
| 2002/0108127 A1 | 8/2002 | Lew et al. | |
| 2002/0133830 A1 | 9/2002 | Kim et al. | |
| 2002/0144259 A1 | 10/2002 | Gutta et al. | |
| 2002/0164987 A1 | 11/2002 | Caronni et al. | |
| 2002/0178440 A1 | 11/2002 | Agnihotri et al. | |
| 2002/0194586 A1 | 12/2002 | Gutta et al. | |
| 2003/0002642 A1 | 1/2003 | Jorasch et al. | |
| 2003/0002862 A1 | 1/2003 | Rodriguez et al. | |
| 2003/0004743 A1 | 1/2003 | Callegari | |
| 2003/0028872 A1 | 2/2003 | Milovanovic et al. | |
| 2003/0037160 A1 | 2/2003 | Wall et al. | |
| 2003/0046704 A1* | 3/2003 | Laksono ............. H04N 7/17336 |
| | | | 725/96 |
| 2003/0052911 A1 | 3/2003 | Cohen-Solal | |
| 2003/0061619 A1 | 3/2003 | Giammaressi | |
| 2003/0067554 A1 | 4/2003 | Klarfeld | |
| 2003/0088878 A1 | 5/2003 | Rogers | |
| 2003/0118029 A1 | 6/2003 | Maher, III et al. | |
| 2003/0135544 A1 | 7/2003 | Richardson | |
| 2003/0154242 A1 | 8/2003 | Hayes et al. | |
| 2003/0154246 A1 | 8/2003 | Ollikainen | |
| 2003/0236745 A1 | 12/2003 | Hartsell et al. | |
| 2004/0009761 A1 | 1/2004 | Money et al. | |
| 2004/0013119 A1 | 1/2004 | Melampy et al. | |
| 2004/0071085 A1 | 4/2004 | Shaham et al. | |
| 2004/0078814 A1 | 4/2004 | Allen | |
| 2004/0107207 A1* | 6/2004 | Kondo ............... H04N 5/44582 |
| 2004/0125757 A1 | 7/2004 | Mela et al. | |
| 2004/0183749 A1 | 9/2004 | Vertegaal | |
| 2004/0221304 A1 | 11/2004 | Sparrell et al. | |
| 2004/0226034 A1 | 11/2004 | Kaczowka et al. | |
| 2004/0230994 A1* | 11/2004 | Urdang .............. H04N 7/17318 |
| | | | 725/88 |
| 2004/0255336 A1 | 12/2004 | Logan | |
| 2004/0264563 A1 | 12/2004 | Inoue et al. | |
| 2004/0266407 A1 | 12/2004 | Lee et al. | |
| 2004/0268407 A1 | 12/2004 | Sparrell et al. | |
| 2004/0268410 A1 | 12/2004 | Barton et al. | |
| 2005/0002662 A1 | 1/2005 | Arpa et al. | |
| 2005/0007965 A1 | 1/2005 | Hagen et al. | |
| 2005/0022239 A1 | 1/2005 | Meuleman | |
| 2005/0024543 A1 | 2/2005 | Ramaswamy et al. | |
| 2005/0039219 A1 | 2/2005 | Cooper et al. | |
| 2005/0066026 A1 | 3/2005 | Chen et al. | |
| 2005/0081252 A1 | 4/2005 | Chefalas | |
| 2005/0097595 A1 | 5/2005 | Lipsanen et al. | |
| 2005/0108328 A1* | 5/2005 | Berkeland .......... H04L 12/1822 |
| | | | 709/204 |
| 2005/0120113 A1 | 6/2005 | Bunch et al. | |
| 2005/0144640 A1 | 6/2005 | Fritsch et al. | |
| 2005/0183110 A1 | 8/2005 | Anderson | |
| 2005/0266825 A1 | 12/2005 | Clayton | |
| 2006/0013266 A1 | 1/2006 | Vega-Garcia et al. | |
| 2006/0025151 A1 | 2/2006 | Karaoguz et al. | |

(56) References Cited

U.S. PATENT DOCUMENTS

| | | |
|---|---|---|
| 2006/0028185 A1 | 2/2006 | Hernandez et al. |
| 2006/0034335 A1 | 2/2006 | Karaoguz et al. |
| 2006/0056389 A1 | 3/2006 | Monk et al. |
| 2006/0095398 A1 | 5/2006 | Bhaskaran et al. |
| 2006/0114360 A1 | 6/2006 | Kortum et al. |
| 2006/0125959 A1 | 6/2006 | Yoshizawa et al. |
| 2006/0144706 A1 | 7/2006 | Adourian et al. |
| 2006/0174266 A1 | 8/2006 | Gatto et al. |
| 2006/0179466 A1 | 8/2006 | Pearson et al. |
| 2006/0184780 A1 | 8/2006 | Yamada et al. |
| 2006/0195866 A1 | 8/2006 | Thukral et al. |
| 2006/0204214 A1 | 9/2006 | Shah et al. |
| 2006/0221826 A1 | 10/2006 | Bedingfield et al. |
| 2006/0222015 A1 | 10/2006 | Kafka et al. |
| 2006/0222110 A1 | 10/2006 | Kuhtz et al. |
| 2006/0225106 A1 | 10/2006 | Bedingfield et al. |
| 2006/0251116 A1 | 11/2006 | Bedingfield et al. |
| 2007/0133603 A1 | 6/2007 | Weaver et al. |
| 2007/0136751 A1 | 6/2007 | Garbow et al. |
| 2007/0136772 A1 | 6/2007 | Weaver et al. |
| 2007/0169142 A1 | 7/2007 | Claassen et al. |
| 2008/0101460 A1 | 5/2008 | Rodriguez |

OTHER PUBLICATIONS

Susy d'Hont, "The Cutting Edge of RFID Technology and Application for Manufacturing and Distribution", Texas Instrument TIRIS, Apr. 16, 2004, retrieved from http://www.ti.com/rfid/docs/manuels/whrPapers/manuf_dist.pdf, pp. 1-13.

* cited by examiner

METHODS, SYSTEMS, AND DEVICES FOR BANDWIDTH CONSERVATION

CROSS-REFERENCE TO RELATED APPLICATIONS

This application is a continuation of U.S. patent application Ser. No. 14/193,652, filed Feb. 28, 2014 which is a continuation of U.S. patent application Ser. No. 11/298,402, filed on Dec. 9, 2005, which further claims the benefit of U.S. Provisional Patent Application 60/713,487, filed Sep. 1, 2005, entitled "TV Bandwidth Conservation Based On User Presence Detection Using Remote Control," and incorporated herein by reference in its entirety.

BACKGROUND

This application generally relates to interactive multimedia distribution systems and, more particularly, to presence detection in such systems.

Bandwidth is becoming a problem in the communications industry. As subscribers demand more and more content, higher definition services, interactive services, and data services, the existing network infrastructure has trouble supplying adequate bandwidth. The industry is hard at work identifying new ways of increasing bandwidth. The industry is also striving to reduce wasted bandwidth.

An "always on" set-top box is one example of wasted bandwidth. An "always on" set-top box continually receives content, even while no one is watching television. When the set-top box remains powered "on" and tuned to a channel, the set-top box consumes bandwidth. Often times, however, that channel is not watched and bandwidth is wasted. Many cable subscribers, for example, forget to, or are unable to, turn "off" their set-top box. Many subscribers power "off" the television, yet the set-top box remains powered "on" and receiving content. It's not uncommon for a set-top box to continually receive a video stream while the subscriber sleeps for hours and/or vacations for days. No one is watching the content, yet the set-top box is consuming network bandwidth. Because communications networks need to efficiently utilize bandwidth, there is a need in the art for reducing bandwidth consumption.

BRIEF SUMMARY

In accordance with exemplary embodiments, methods, systems, devices, and computer program products that conserve bandwidth in communications networks are provided. A method includes monitoring, via a processor over a period of time, program state information for content streamed to an electronic device. The method also includes accumulating, in a memory device via the processor, inputs received over the period of time from a user of the electronic device. Each of the inputs is correlated to the program state information based on a location in the content at which the corresponding input occurred. The method further includes identifying patterns of user behavior based on collective correlations between the inputs and the program state information, determining from the patterns a presence or absence of the user at the electronic device with respect to currently streamed content when no inputs are received by the user, and performing a bandwidth control operation with respect to the currently streamed content based on the determined presence or absence of the user.

Other systems, methods, and/or devices according to the exemplary embodiments will be or become apparent to one with skill in the art upon review of the following drawings and detailed description. It is intended that all such additional systems, methods, and/or devices be included within this description, be within the scope of the exemplary embodiments, and be protected by the accompanying claims.

BRIEF DESCRIPTION OF THE DRAWINGS

These and other features, aspects, and advantages of the exemplary embodiments are better understood when the following Detailed Description is read with reference to the accompanying drawings, wherein.

DETAILED DESCRIPTION OF EXEMPLARY EMBODIMENTS

Figure 1:
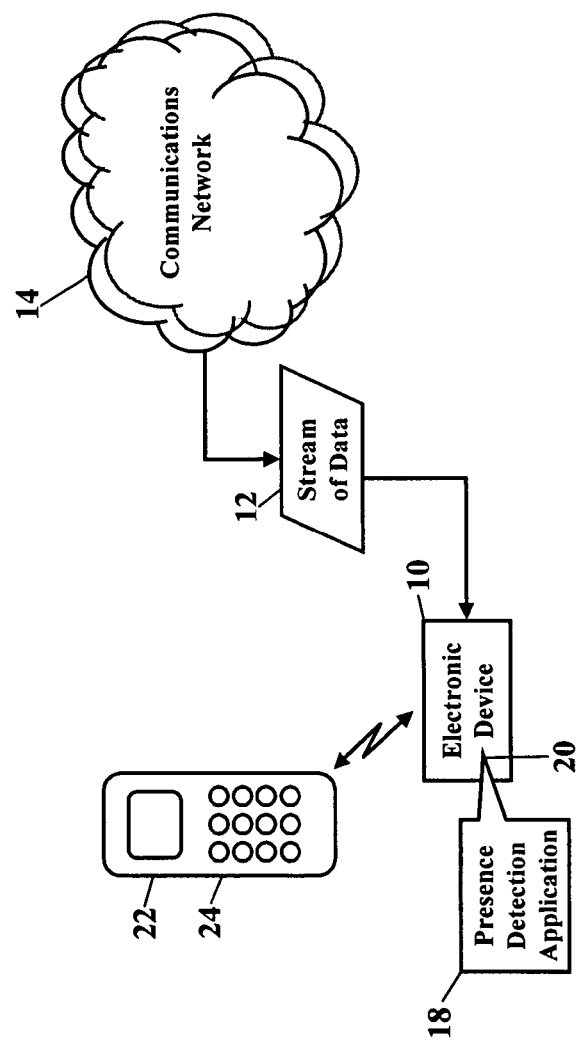
FIG. 1 is a simplified schematic illustrating an operating environment, according to exemplary embodiments.

The exemplary embodiments now will be described more fully hereinafter with reference to the accompanying drawings. The reader should recognize, however, that the exemplary embodiments may be embodied in many different forms and should not be construed as limited to the embodiments set forth herein. These embodiments are provided so that this disclosure will be thorough and complete and will fully convey the scope of the exemplary embodiments. Moreover, all statements herein reciting exemplary embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods of the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the exemplary embodiments. Those of ordinary skill in the art further understand that the exemplary hardware, software, processes, methods, and/or operating systems described herein are for illustrative purposes and, thus, are not intended to be limited to any particular named manufacturer.

The exemplary embodiments describe methods, systems, and devices that conserve bandwidth in communications networks. These exemplary embodiments describe how a multimedia service provider can reduce the occurrences of wasted bandwidth. These exemplary embodiments minimize bandwidth consumption of an established session by detecting the physical presence of a user. If the user is physically present, then the exemplary embodiments deliver a stream of data to a multimedia electronic device, and a bit rate of the stream of data is appropriate to the needs of the electronic device. If, however, the physical presences of the user cannot be detected, inferred, or predicted, then there is little or no need for a full-resolution feed to the electronic device. The exemplary embodiments, instead, degrade or even terminate the stream of data to conserve bandwidth in the network. The terms "degrade," "degraded," "degradation," and other variants mean the resolution of the stream of data is reduced to conserve bandwidth. When the stream of data is degraded, the degraded stream of data still preserves an established data session, yet the degraded stream of data has a reduced bit rate to reduce bandwidth consumption. When the physical presence of the user is again detected or inferred, then the exemplary embodiments restore the stream of data to its full-resolution data rate. The exemplary embodiments, therefore, reduce the occurrences of wasted bandwidth.

FIG. 1 is a simplified schematic illustrating an operating environment, according to exemplary embodiments. FIG. 1 shows an electronic device 10 receiving a stream 12 of data via a communications network 14. The electronic device 10 can be any device, such as a set-top box, a television, or an integrated television and set-top box. The electronic device 10 may also be an analog/digital recorder, CD/DVD player/recorder, audio equipment, receiver, tuner, and/or any other consumer electronic device. The electronic device 10 may also include any computer, peripheral device, camera, modem, storage device, telephone, personal digital assistant, and/or mobile phone. The stream 12 of data may be any RF and/or digital content, such as television/cable programming, .mpg streams, or any other content. The communications network 14 may be a cable network operating in the radio-frequency domain and/or the Internet Protocol (IP) domain. The communications network 14, however, may also include a distributed computing network, such as the Internet (sometimes alternatively known as the "World Wide Web"), an intranet, a local-area network (LAN), and/or a wide-area network (WAN). The communications network 14 may include coaxial cables, copper wires, fiber optic lines, and/or hybrid-coaxial lines. The communications network 14 may even include wireless portions utilizing any portion of the electromagnetic spectrum and any signaling standard (such as the IEEE 802 family of standards).

As FIG. 1 shows, the electronic device 10 also detects or monitors the physical presence of a user. The user is generally a person in the vicinity of the electronic device (such as in the same room) and who is watching, listening to, or otherwise experiencing a movie, game, TV program, or other content represented by the stream 12 of data. The user may be a customer, a subscriber, a viewer, a listener, or any other person experiencing content delivered to the electronic device 10. A presence detection application 18 is a computer program that infers the presence of the user. The presence detection application 18 stores in memory 20 of the electronic device 10 and monitors or detects when the user is present. The term "present" implies the user is watching, listening to, or otherwise experiencing the content represented by the stream 12 of data. If the user is experiencing the stream 12 of data, then the bandwidth allocated to that stream 12 of data is maintained. If, however, the user is not watching or otherwise experiencing the delivered stream 12 of data, then perhaps bandwidth is being wasted. The presence detection application 18, then, may (or may not) conserve bandwidth.

The presence detection application 18 predicts the presence of the user. The presence detection application 18 monitors inputs to the electronic device 10 and predicts when the user is present, thus justifying the allocated bandwidth. The presence detection application 18, for example, monitors inputs received via a user interface 22. The electronic device 10 includes the user interface 22, and the user interface 22 provides direct or menu-driven access to functions, features, and settings for the electronic device 10. The user interface 22, for example, may be a keyboard, a keypad, control panel, soft-touch control buttons, voice-activated or voice-recognition software, graphical user interface, or any other means for inputting commands to the electronic device 10. Although the user interface 22 may be any means for inputting commands, FIG. 1 illustrates the user interface 22 as a wireless remote control 24. The user interface 22 may include any combination of alphabetic, numeric, and iconic character buttons. The user interface 22 may also include cursor movement buttons that enable the user to scroll and to sequence through menu options. If the user is making inputs via the user interface 22, then those inputs are a positive indication that the user is present and the allocated bandwidth is justified. If, however, no inputs are received over a period of time, then, as the following paragraphs explain, the presence detection application 18 may or may not infer that the user is or is not present. If the user is not watching, listening to, or otherwise experiencing the stream 12 of data, then the allocated bandwidth for the stream 12 of data may be reduced to conserve network resources.

Figure 2:
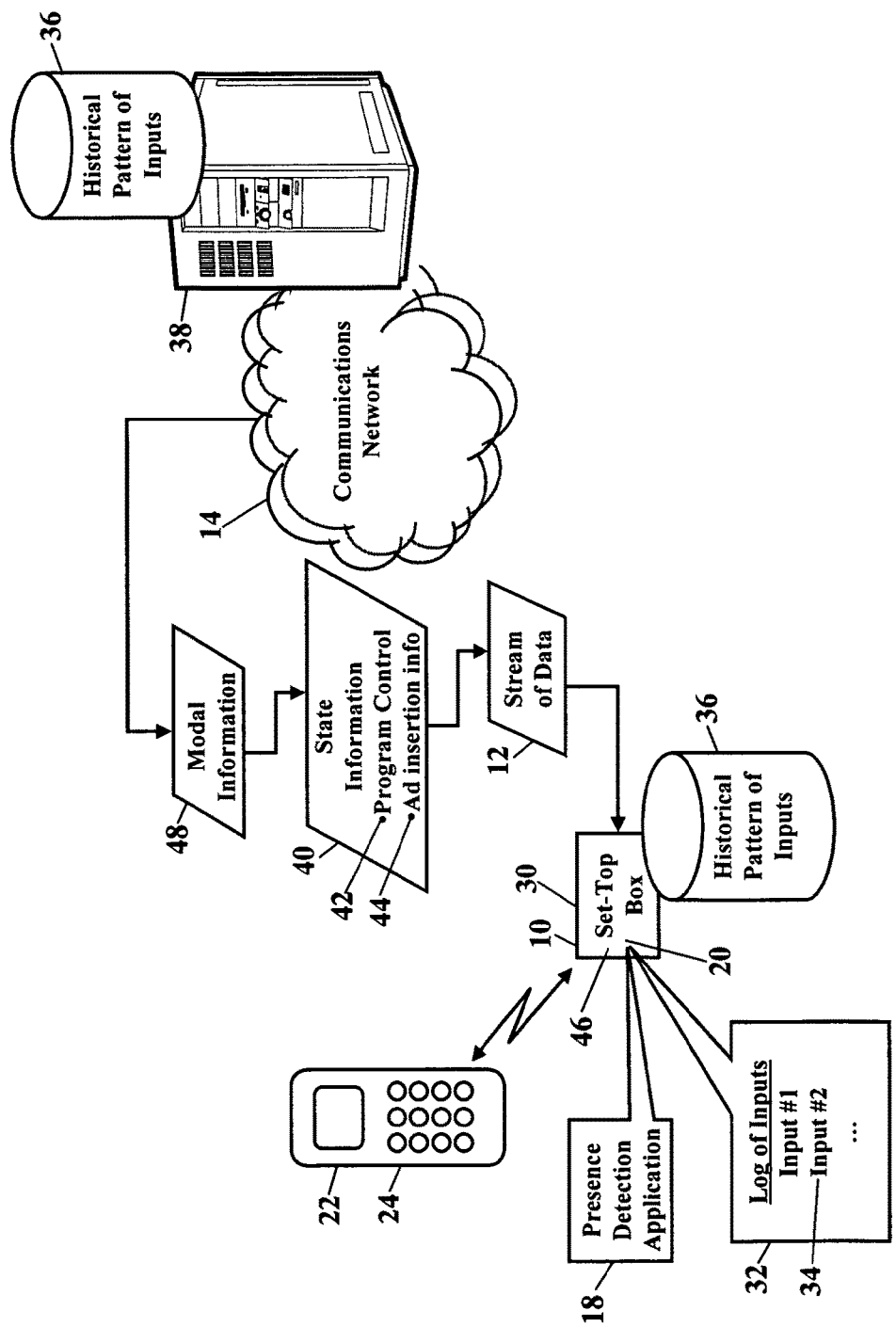
FIG. 2 is a more detailed schematic illustrating exemplary embodiments.

FIG. 2 is a more detailed schematic illustrating exemplary embodiments. The electronic device 10 again receives the stream 12 of data via the communications network 14. Although the electronic device 10 may be any device, here the electronic device 10 is shown as a set-top box 30. The set-top box 30 receives and decodes the stream 12 of data. The presence detection application 18 is an algorithm stored in the memory 20 of the set-top box 30, and the presence detection application 18 monitors or detects when the user is present. If the presence detection application 18 infers that the user is present, then the presence detection application 18 maintains the full-resolution of the stream 12 of data. If, however, the presence detection application 18 infers that the user is not watching, listening to, or otherwise experiencing the stream 12 of data, then the allocated bandwidth for the stream 12 of data may be reduced to conserve network resources.

As FIG. 2 illustrates, the presence detection application 18 monitors inputs received via the user interface 22. As the user makes channel changes, cursor movements, volume commands, and other inputs via the user interface 22, the presence detection application 18 accumulates those inputs in the memory 20. Again, while the user interface 22 may be a keyboard, keypad, control panel or other means for inputting commands, FIG. 2 illustrates the user interface 22 as the remote control 24. As each input to the remote control 24 is received, the input is stored in the memory 20. The inputs may be stored as a log 32, with each entry 34 describing at least the input and the time the input was entered, received, or logged. The inputs may be sequentially stored throughout time. More likely, however, the inputs are stored during any period of time from seconds to years, depending on the amount of available memory. When the memory allocated to the log 32 is filled, the log 32 would sequentially replace the earliest entry with the newest entry. The user may even configure the memory 20 and the log 32 to select the amount of memory allocated to the log 32, and the presence detection application 18 may prompt the user to increase memory allocation when the log 32 is nearly full.

The presence detection application 18 may also predict presence using historical patterns. These historical patterns tell the presence detection application 18 when to expect activity at the user interface 22. When activity is expected, and inputs to the user interface 22 are received, then the presence detection application 18 may infer the user is present, thus justifying the allocated bandwidth. If, however, no inputs are received when expected, then perhaps the user is not present and bandwidth is being wasted.

As FIG. 2 also illustrates, the presence detection application 18 may access a historical pattern 36 of inputs. The historical pattern 36 of inputs may be stored in a database that is locally maintained in the memory 20 of the electronic device 10. The historical pattern 36 of inputs may be additionally or alternatively be stored at a remote location, such as a remote server 38 communicating with the electronic device 10 via the communications network 14. However the historical pattern 36 of inputs is accessed, the historical pattern 36 of inputs stores historical information describing behavioral patterns of inputs to the user interface 22. The historical pattern 36 of inputs may be associated with the individual user, such as a learned pattern of input events or some interval of time describing historical use associated with the user. The historical pattern 36 of inputs, however, may additionally or alternatively be a pattern of inputs collected from a sample of users or collected from a population of users across a node, branch, region, or other grouping. The presence detection application 18 may even itself analyze the log 32 of inputs, looking for any patterns of usage.

As the user makes inputs via the user interface 22 (e.g., the remote control 24), the presence detection application 18 may analyze those inputs for trends. The user, for example, may have a history of making inputs after a transition in content. When content programming transitions to an advertisement, the user may have a history of making channel or content changes after the transition. If the content transitions to an advertisement, but no inputs are received, then perhaps the user is not present and bandwidth is being wasted. The historical pattern 36 of inputs may, likewise, also indicate that, at a certain time of day, the user interface 22 usually receives inputs. The user, for example, may "surf" content near the top of the hour, when content providers typically transition programming offerings. If that time of day passes with little or no inputs, then perhaps again the user is not present and bandwidth is being wasted. The presence detection application 18 may thus predict presence of the user by comparing historical patterns to actual inputs received via the user interface 22.

The presence detection application 18 may also predict presence using state information 40. This state information 40 describes a current state of the stream 12 of data being received at the electronic device 10. The state information 40 describes, at any particular moment in time, the content represented by the stream 12 of data. The state information 40, for example, may describe programming timing and indicate that the stream 12 of data is currently near the middle (or any other point) of a movie, TV program, song, or other content. The state information 40 may also indicate top of the hour, bottom of the hour, or other advertisement insertion slots. The state information 40 may be transmitted by a service provider, content provider, head end, server, or any other entity and received at the electronic device 10 via the communications network 14. The state information 40 may be transmitted with the stream 12 of data, or the state information 40 may be separately transmitted as a timing signal. However the state information 40 is received, the presence detection application 18 may receive and analyze this state information 40 when predicting presence.

The state information 40 may include a program control information signal 42. The program control information signal 42 may be delivered with programming and other content received via the communications network 14. The program control information signal 42 may be transmitted by a content provider, a network operations center, a head-end, or any other entity. The program control information signal 42 may contain a description of the content or packages of content, such as channel number, program title, program length, program category, and start/end times. The program control information signal 42 may also contain menu content, such as menu locations for messages, graphics and video, menu colors, text fonts, sizes, and styles, and other menu information. The program control information signal 42 may also contain commands for the electronic device 10 (e.g., the set-top box 30) and other information relevant to signal transmission.

As FIG. 2 also illustrates, the state information 40 may additionally or alternatively include advertisement insertion information 44. The advertisement insertion information 44 is used when inserting an advertisement into the stream 12 of data. The advertisement insertion information 44 may be inserted at the headend and sent via the communications network 14 or embedded in the stream 12 of data (or other program signal). The advertisement insertion information 44, for example, may include "Q-tones" or other information that identifies a point in the stream 12 of data in which an advertisement is inserted. The presence detection application 18 may interface with an MPEG decoder 46 that is capable of detecting, decoding, and/or or hearing MPEG Q-tones within the stream 12 of data. As those of ordinary skill in the art understand, the Q tone provides the MPEG decoder 46 and/or the presence detection application 18 with an advance indication of a point in the content where an advertisement is inserted. The Q tone provides a set time (e.g., 30 or 60 seconds) after which the advertisement should begin. Because Q-tones are well understood by those of ordinary skill in the art, Q-tones will not be further explained.

The presence detection application 18 may also predict presence using modal information 48. This modal information 48 describes a current mode of operation for the electronic device 10. The modal information 48, for example, may indicate that the electronic device 10 is currently operating in a broadband mode (e.g., receiving the stream 12 of data via a broadband connection to the communications network 14). The modal information 48 could additionally or alternatively indicate the electronic device 10 is operating in a broadcast mode. The electronic device 10, for example, may be wirelessly receiving the stream 12 of data via an AM/FM/VHF/UHF transmission, via a CDMA/TDMA/GSM or variant signaling standard, via an industrial, scientific, and medical band (ISM) (e.g., BLUETOOTH®) transmission, via a satellite transmission, via any of the IEEE 802 family of standards, or via any portion of the electromagnetic spectrum. The modal information 48 may additionally or alternatively indicate the electronic device 10 is operating in an auxiliary mode, such as receiving auxiliary content from a DVD/CD-ROM, VHS, digital recorder, or other memory storage component. The modal information 48 may additionally or alternatively indicate the electronic device 10 is operating in a gaming mode and, thus, receiving and/or visually or audibly presenting a game. Whatever the mode of operation, the presence detection application 18 may use this modal information 48 when predicting the presence of the user.

The presence detection application 20 then uses any of the above-described information sources to predict presence. The presence detection application 20 receives and analyzes the inputs received via the user interface 22, the historical pattern 36 of inputs, the state information 40, and/or the modal information 48. The presence detection application 20 then intelligently predicts whether the user is currently present and experiencing the stream 12 of data.

An example provides additional explanation. Suppose the electronic device 10 is in a broadband mode of operation and is receiving content. The state information 40 indicates the stream 12 of data is nearing the middle of a three-hour movie. The state information 40 also includes timing information indicating that a top of the hour is approaching. At the top of the hour, the presence detection application 20 knows to expect inputs to the user interface 22, based on trends from the historical pattern 36 of inputs. The historical pattern 36 of inputs, for example, indicates that the user, or a group of users, commonly makes "surfs" or makes channel changes at the top of the hour, when programming transitions to advertisements. Because the user is in the middle of a commercial-free movie, however, the user may not normally "surf" content at the top of the hour. If the presence detection application 20 heeded the historical information, the lack of inputs at the top of the hour could erroneously indicate that the user is not present and that bandwidth is being wasted.

Yet the presence detection application 20 is more intelligent. Because the user is in the middle of a movie, the presence detection application 18 may ignore historical information describing top-of-the-hour inputs. As the presence detection application 20 builds the log 32 of inputs, each entry 34 may be correlated with the corresponding state information 40 and with the corresponding modal information 48. Such information may describe the operation of the electronic device 10, such as whether the input was made after transition to a commercial, during a commercial-free movie, or during a gaming mode. If the state information 40 indicates the electronic device 10 is receiving a movie without inserted ads, the presence detection application 18 may decide to ignore historical information. That is, if the state information 40 does not include ad insertion information, the presence detection application 18 should not expect inputs to the user interface 22 at the top of the hour, at the bottom of the hour, or at other times of typical ad insertion. The presence detection application 18, instead, maintains the bandwidth allocated to the stream 12 of data, knowing that the user is in the middle of a commercial-free movie.

The presence detection application 18 thus helps conserve bandwidth. When the presence detection application 18 infers that the user is present, the allocated bandwidth for the stream 12 of data may be justified and maintained. The presence detection application 18 makes no change in the data rate of the stream 12 of data. That is, the stream 12 of data is continually delivered at its full resolution, whatever that full resolution may be. When, however, the presence detection application 18 infers that the user is not present, actions are taken to conserve bandwidth. If the presence detection application 18 cannot detect or infer the presence of the user, then there may be no need to communicate a high-bandwidth stream 12 of data from the communications network 14. As the following paragraphs will explain, when the presence of the user cannot be predicted or detected, the presence detection application 18 causes degradation in the stream 12 of data. The stream 12 of data may be degraded to a reduced-resolution version to conserve bandwidth. The stream 12 of data may even be terminated.

Figure 3:
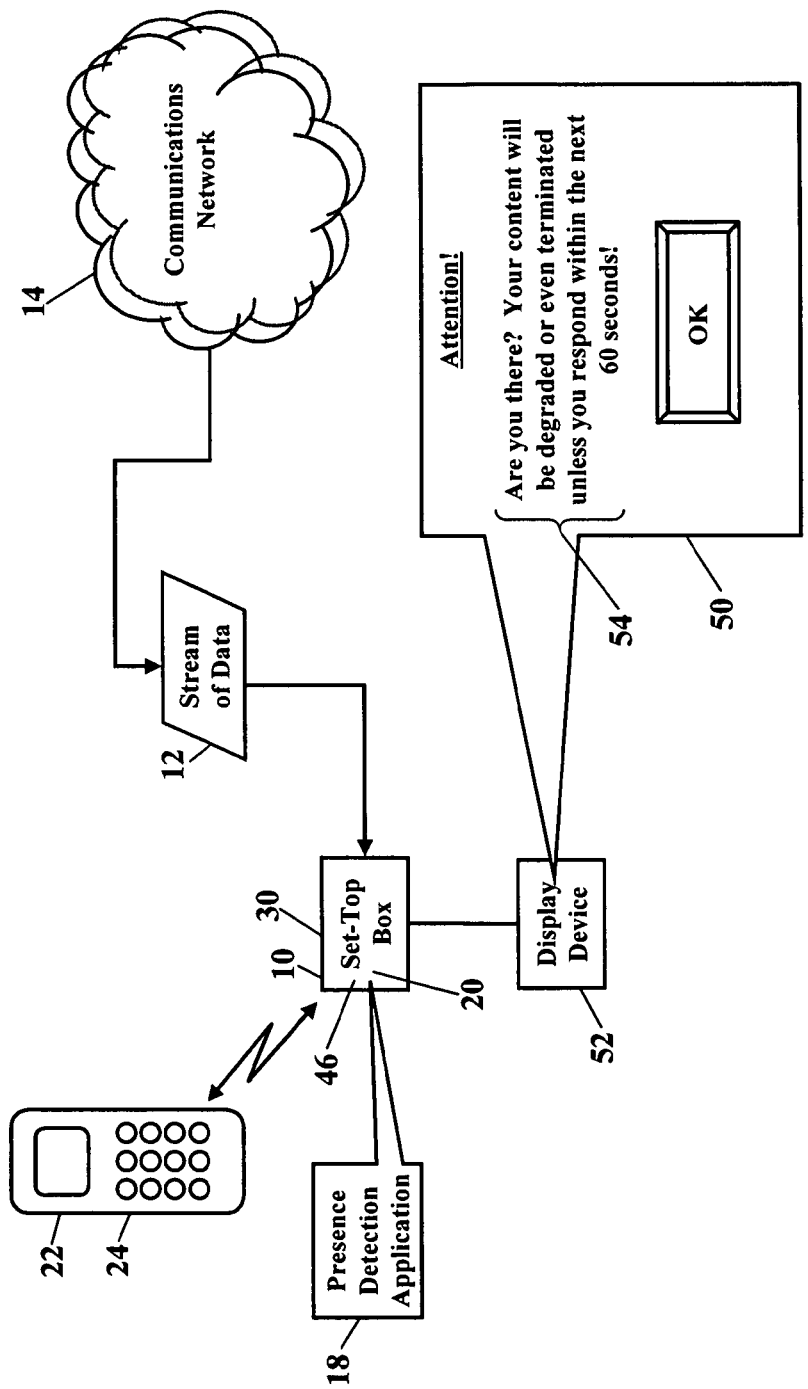
FIG. 3 is a schematic illustrating a bandwidth prompt 50, according to even more exemplary embodiments.

FIG. 3 is a schematic illustrating a bandwidth prompt 50, according to even more exemplary embodiments. When the presence detection application 18 infers that the user is not present, here the presence detection application 18 may visually and/or audibly cause a display device 52 (such as a television or monitor) to produce the bandwidth prompt 50. The bandwidth prompt 50, for example, may visually and/or audibly present a message 54, notifying the user that the high-resolution version of the stream 12 of data is about to be degraded, or even terminated, unless the user responds. The presence detection application 18 may recognize any input via the user interface 22 as an affirmative response, thus confirming full-resolution is desired. That is, if the user makes any input (such as pushing a button on the remote control 24), then the presence detection application 18 knows that the user is truly present and the high-resolution version of the stream 12 of data should be maintained.

When the bandwidth prompt 50 is presented, the presence detection application 18 may even recognize any movement of the remote control 24 as an affirmative response. That is, perhaps the remote control 24 comprises an accelerometer or other movement or position sensor that detects movements, and such movement affirmatively indicates the user is present. The user interface 22 may additionally or alternatively comprise any means for sensing movement, such as a gravity switch, a mercury switch, a GPS transmitter or receiver, an infrared transmitter or receiver, any transmitter or receiver utilizing any portion of the electromagnetic spectrum, or any device utilizing the Doppler Effect. The bandwidth prompt 50 may include a visual and/or audible timer that counts down the remaining time until degradation. If no response to the bandwidth prompt 50 is detected, then the presence detection application 18 implements actions to reduce bandwidth.

Figure 4:
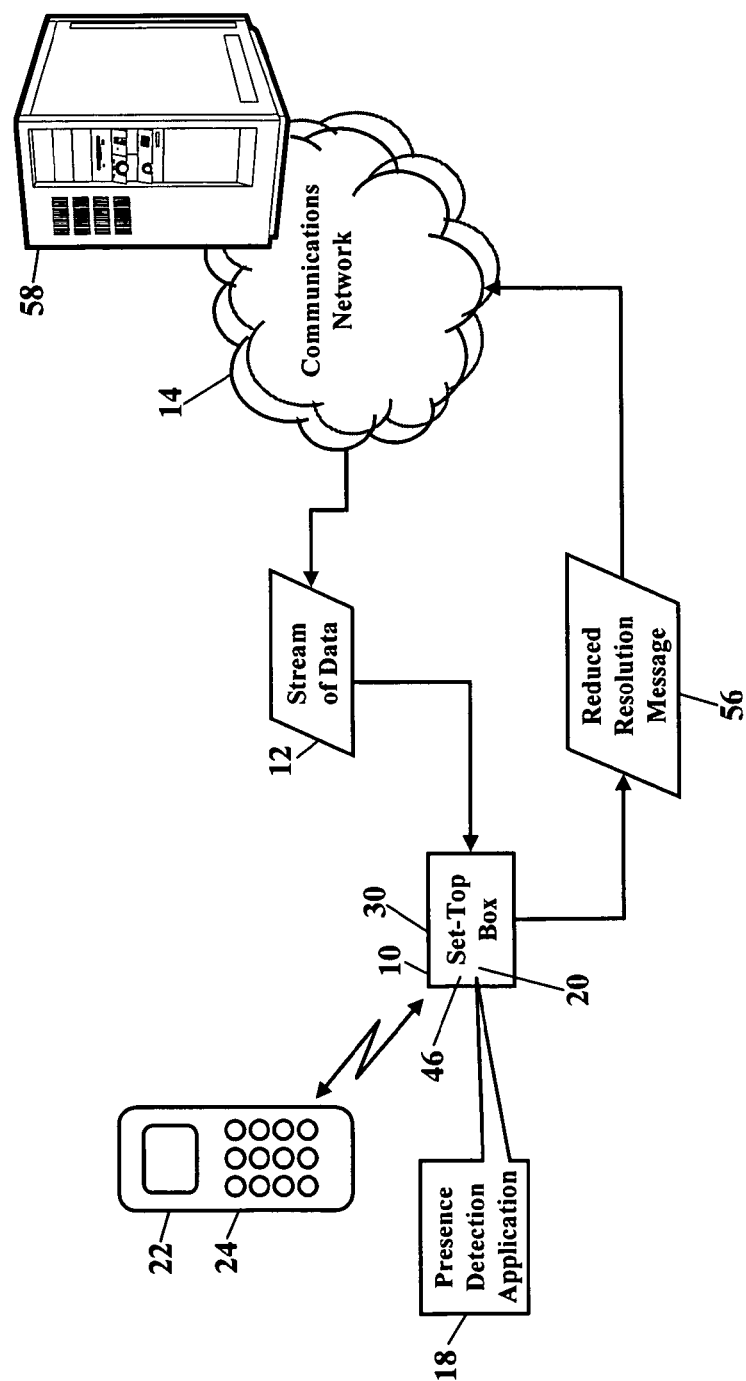
FIG. 4 illustrates a reduced resolution message, according to yet more exemplary embodiments.

FIG. 4 illustrates a reduced resolution message 56, according to yet more exemplary embodiments. When the presence detection application 18 infers that the user is not present, then bandwidth is possibly being wasted. The presence detection application 18 may immediately take actions to reduce bandwidth consumption. The presence detection application 18 may additionally produce the bandwidth prompt (shown as reference numeral 50 in FIG. 3) to confirm the presence of the user. Regardless, when the presence detection application 18 is ready to conserve network resources, the presence detection application 18 sends the reduced resolution message 56 to a server 58. The stream 12 of data is sent by the server 58, and the reduced resolution message 56 instructs the server 58 to reduce the resolution of the stream 12 of data. The server 58 receives the reduced resolution message 56 via the communications network 14.

Figure 5:
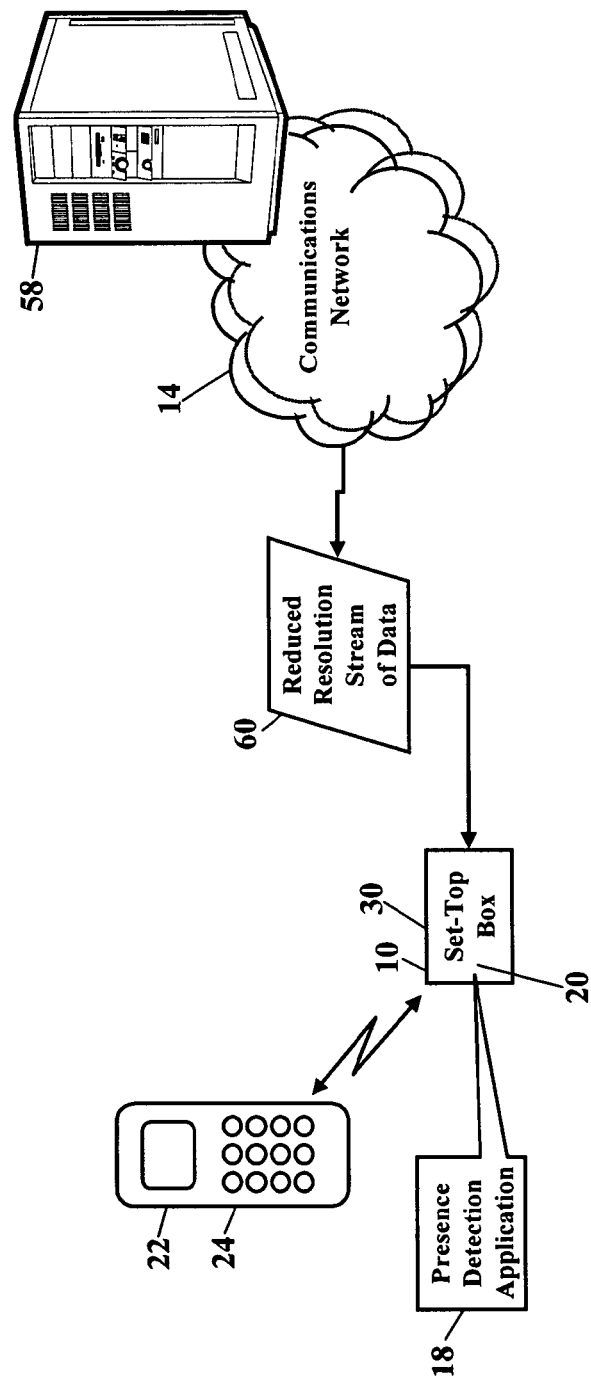
FIG. 5 is a schematic illustrating transmission of a reduced resolution stream of data, according to exemplary embodiments.

FIG. 5 is a schematic illustrating transmission of a reduced resolution stream 60 of data, according to exemplary embodiments. When the server 58 receives the reduced resolution message 56, the server 58 implements strategies to conserve network resources. The reduced resolution message 56 instructs the server 58 to reduce the resolution of the stream 12 of data. As FIG. 5 illustrates, the reduced resolution stream 60 of data is then processed and sent from the server 58 to the set-top box 30 via the communications network 14. The reduced resolution stream 60 of data has a reduced data rate measured in bytes per second. Because the reduced resolution stream 60 of data has a reduced data rate, the bandwidth allocated to the set-top box 30 may be reduced and reallocated to other uses within the communications network 14. The reduced resolution stream 60 of data may have reduced resolution audio and/or video portions to conserve bandwidth.

Figure 6:
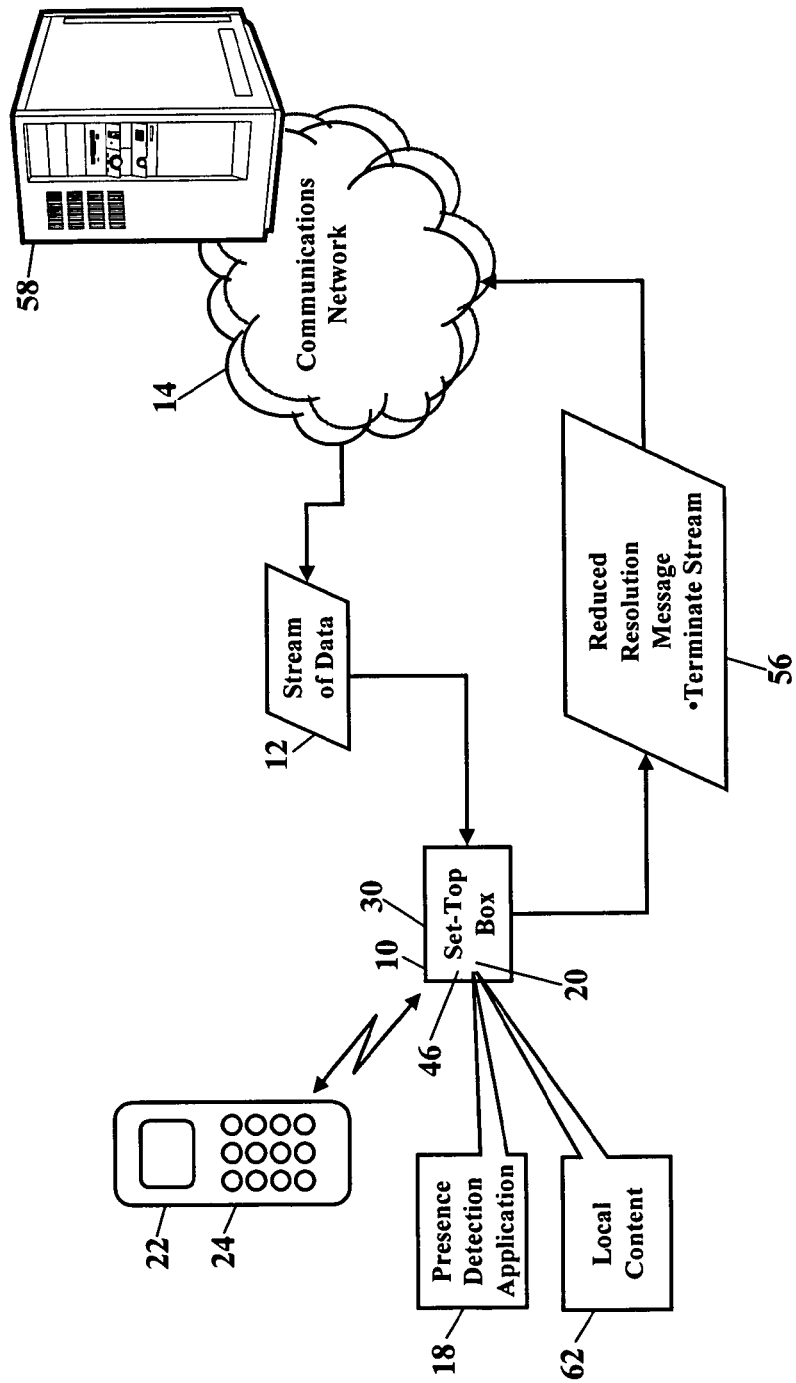
FIG. 6 is a schematic illustrating local retrieval of content, according to more exemplary embodiments.

FIG. 6 is a schematic illustrating local retrieval of content, according to more exemplary embodiments. Here, when the presence detection application 18 sends the reduced resolution message 56 to the server 58, the reduced resolution message 56 instructs the server 58 to terminate the stream 12 of data. That is, the presence detection application 18 instructs the server 58 to cease delivery of the full-resolution stream 12 of data. The presence detection application 18, instead, locally retrieves content from the memory 20 and causes that local content to be visually and/or audibly presented to the user. When the presence detection application 18 infers that the user is not present, the presence detection application 18 ceases transmission of the stream 12 of data for maximum reduction in bandwidth. The presence detection application 18 then reverts to local content 62 retrieved from the local memory 20. The local content 62 may be a movie, music, slide show, family photos, or any other file (having any format or extension). The local content 62 still presents audio and/or video content, yet the local content 62 is not drawing or requiring bandwidth from the communications network 14. The local content 62 may be selected and downloaded by a content provider, a service provider, or by a network operator. The local content 62 may also be selected and configurable by the user.

The local content 62 may be advantageously selected. The presence detection application 18, for example, may retrieve a promotion that is locally stored in the memory 20. The promotion encourages the user to select or to tune to content, a product, or a service that might be of interest to the user. That content, product, or service could also generate revenue for the network operator and/or the content provider. Perhaps, for example, the presence detection application 18 detects or infers that the user is not present. The presence detection application 18 may then terminate the stream 12 of data and, instead, retrieve a promotion channel from local memory. The promotion channel may promote video-on-demand services, special event programming, or other pay-per-view programming that may appeal to the user. If the user is present and intrigued, the user may make a purchase.

The presence detection application 18 may implement other actions. When the presence detection application 18 infers that the user is not present, then bandwidth is possibly being wasted. The presence detection application 18 may immediately take actions to reduce bandwidth consumption. The presence detection application 18 may assume the user has left the room or fallen asleep and disable or "turn off" the screen and speakers. Whenever the presence detection application infers with a high probability that the user is not present, the presence detection application 18 may lower the volume. If the user is present, the user should be motivated to restore the volume or provoked to make some other input. The presence detection application 18 may be configured for other scenarios that reduce bandwidth consumption.

Figure 7:
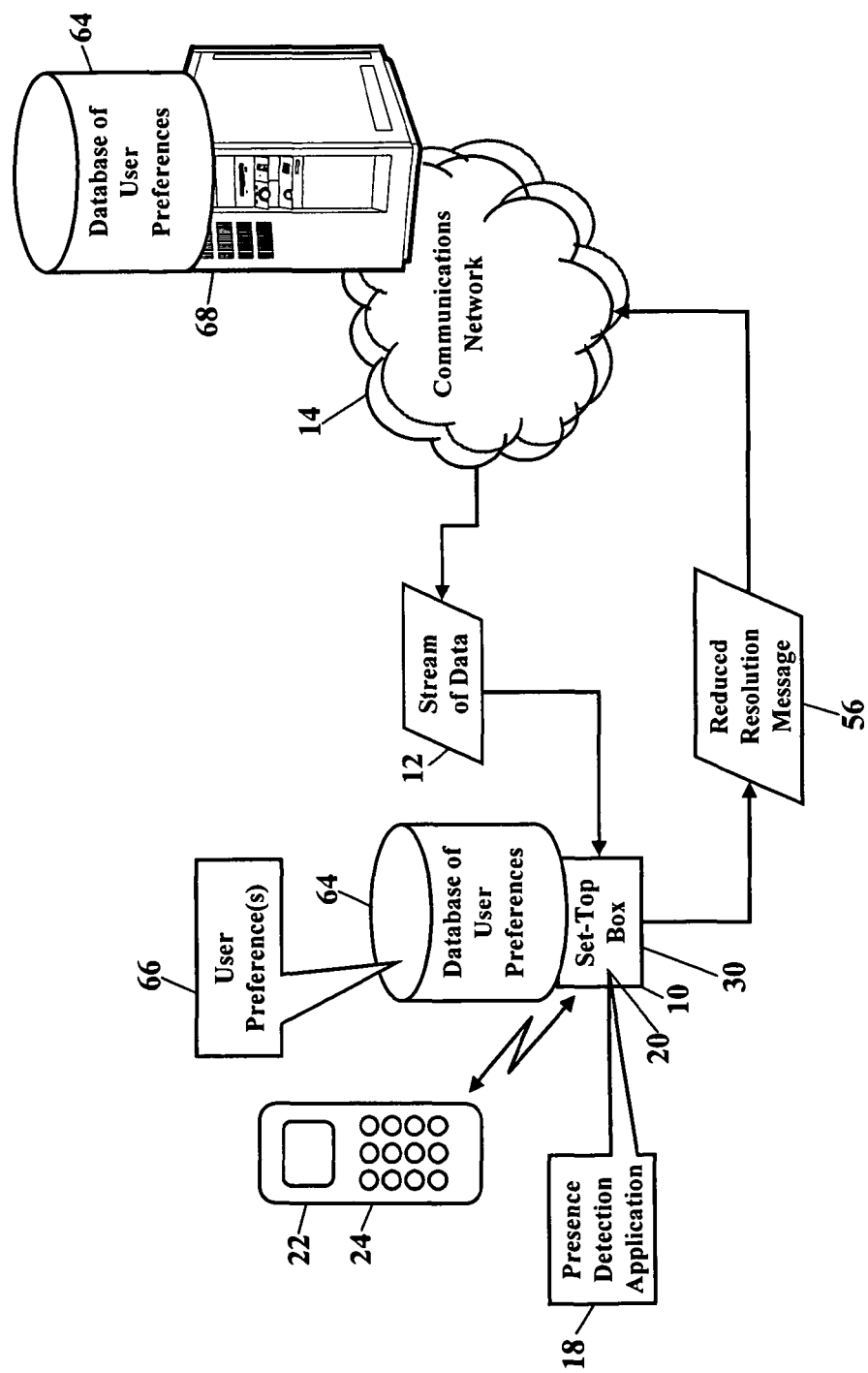
FIG. 7 is a schematic illustrating the use of user preferences when conserving bandwidth, according to yet more exemplary embodiments.

FIG. 7 is a schematic illustrating the use of user preferences when conserving bandwidth, according to more exemplary embodiments. Here, when the presence detection application 18 takes actions to conserve bandwidth, the presence detection application 18 consults a database 64 of user preferences. The database 64 of user preferences stores one or more preferences 66 associated with the user. The database 64 of user preferences may be locally stored in the memory 20 of the electronic device 10. The database 64 of user preferences may be additionally or alternatively be stored at a remote location, such as a remote server 68 communicating with the electronic device 10 via the communications network 14. These preferences 66 describe how the user wishes the stream 12 of data to be degraded when conserving bandwidth. The user, for example, may have a preference for an audio-only version of the stream 12 of data, such that video portions are discarded or otherwise not transmitted. The user may alternatively prefer a grainy video portion and/or a smaller sized resolution version of the stream 12 of data. The user may prefer that the stream 12 of data be terminated. How the user specifies their preferences may depend on economic factors. If, for example, the user pays a per-minute charge for broadband usage, the user may prefer that the stream 12 of data be terminated when presence is not detected. If the user pays according to data rate, then the user may prefer that the stream 12 of data be degraded, or again even terminated, when conserving bandwidth. The network operator, service provider, or content provider may even provide incentives to conserve bandwidth. These incentives, for example, may cause the user to agree to termination or to degradation during peak demand times, designated events, network outages, or any other circumstances.

Figure 8:
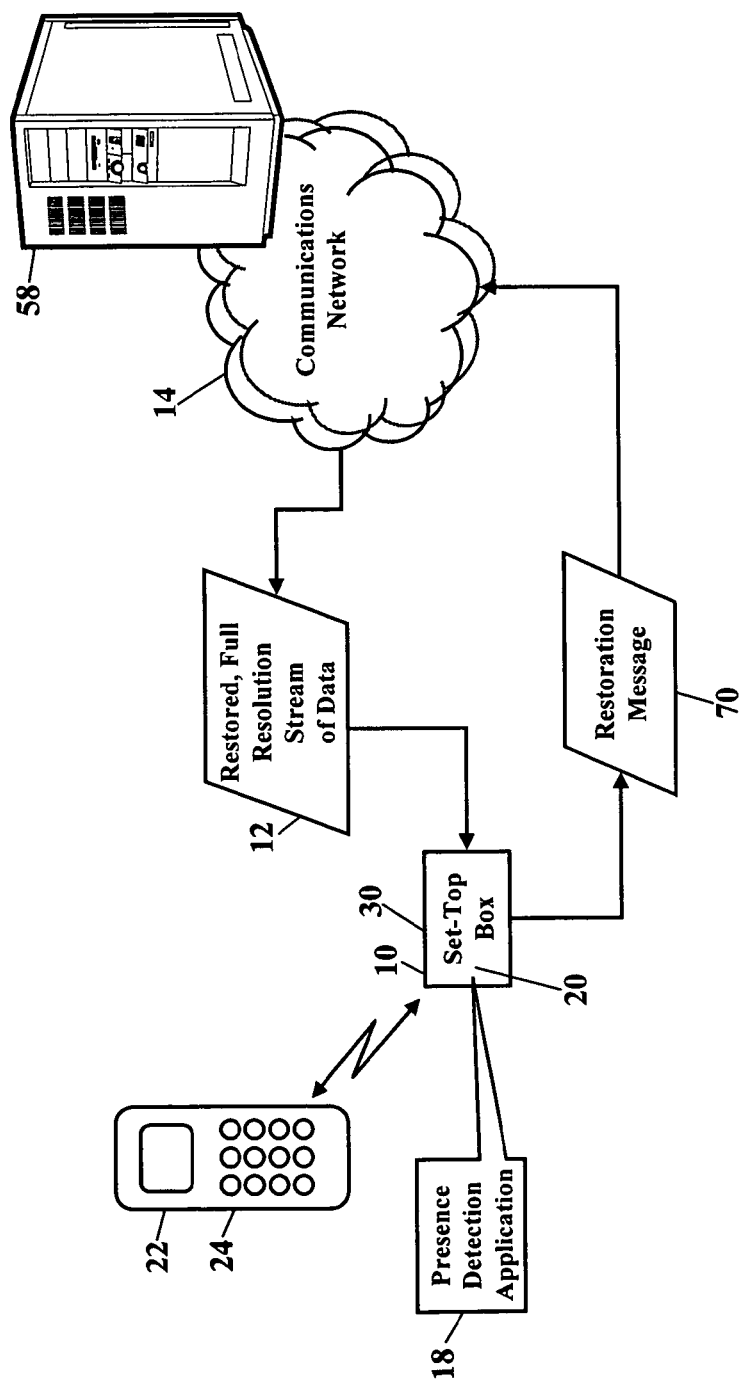
FIG. 8 is a schematic illustrating the restored, full-resolution stream 12 of data, according to exemplary embodiments.

FIG. 8 is a schematic illustrating the restored, full-resolution stream 12 of data, according to exemplary embodiments. The presence detection application 18 may continually monitor for the presence of the user. When the presence of the user is redetected, or inferred, then the presence detection application 18 causes a restoration in the data rate (e.g., bytes per second) of stream 12 of data. The presence detection application 18 sends a restoration message 70 to the server 58, and the restoration message 70 instructs the server 58 to restore the full-resolution data rate of the stream 12 of data. When the server 58 receives the restoration message 70, the server 58 resumes sending the full-resolution version of the stream 12 of data.

The presence detection application 18 may also send the restoration message 70 upon any input via the user interface 22. As the above paragraphs explained, the presence detection application 18 may recognize any input via the user interface 22 as an affirmative indication of the presence of the user. As the electronic device 10 receives the reduced resolution stream of data (shown as reference numeral 60 in FIG. 5), the presence detection application 18 continually monitors for the presence of the user. Should the presence detection application 18 infer the presence of the user, then the presence detection application 18 restores the full-resolution version of the stream 12 of data. When, for example, the user makes any input via the user interface 22 (such as pushing a button on the remote control 24) after bandwidth is conserved, then the presence detection application 18 knows that the user is present and the high-resolution version of the stream 12 of data should be restored. The user, as earlier explained, may simply move the remote control 24 to indicate his or her presence. Such movement causes the presence detection application 18 to send the restoration message 70, thus instructing the server 58 to resume sending the full-resolution version of the stream 12 of data.

Figure 9:
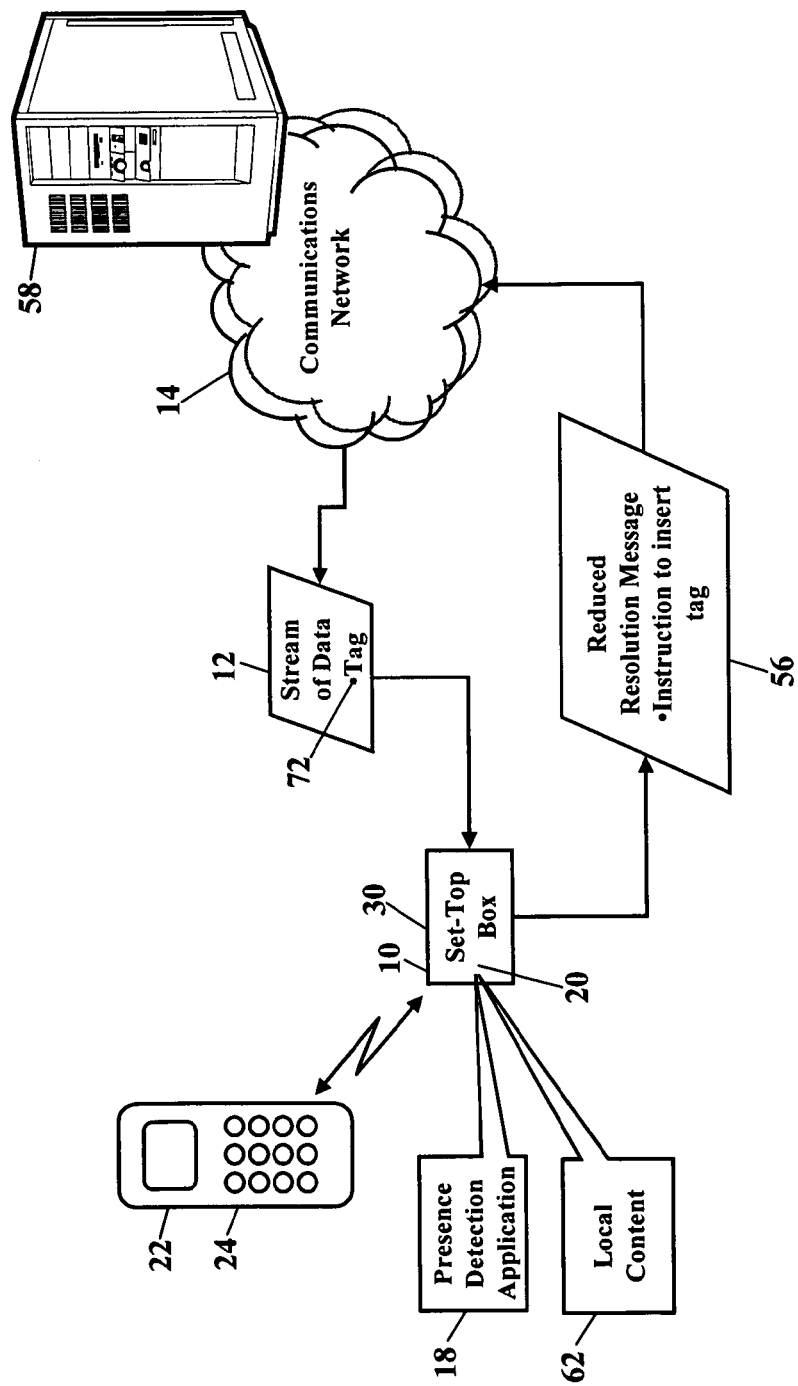
FIG. 9 is a schematic illustrating the use of tags, according to still more exemplary embodiments.

FIG. 9 is a schematic illustrating the use of tags, according to still more exemplary embodiments. Recall that when the presence detection application 18 infers that the user is not present, the presence detection application 18 sends the reduced resolution message 56 to the server 58. The reduced resolution message 56 instructs the server 58 to reduce the resolution of the stream 12 of data. The server 58 then processes and sends the reduced resolution stream of data (shown as reference numeral 60 in FIG. 5). The reduced resolution stream of data has a reduced data rate measured in bytes per second. Here, however, the presence detection application 18 also instructs the server 58 to mark or tag the full-resolution version of the stream 12 of data. The full-resolution version of the stream 12 of data is tagged at the point it was interrupted. A tag 72 is inserted into the full-resolution version of the stream 12 of data at the point in time at which degradation occurs. If the presence detection application 18 has erred—that is, the presence detection application 18 has incorrectly inferred that the user is not present—then the presence detection application 18 can return the user to the point in the stream 12 of data prior to degradation. Should the user affirmatively respond to the bandwidth prompt (shown as reference numeral 50 in FIG. 3), make an input via the user interface 22, move the remote control 24, or any other action that indicates the user is present, then the full-resolution version of the stream 12 of data is resumed from the moment or time denoted by the tag 72. The user need only pick up or move the remote control 24 and the presence detection application 18 restores to the previous state.

Figure 10:
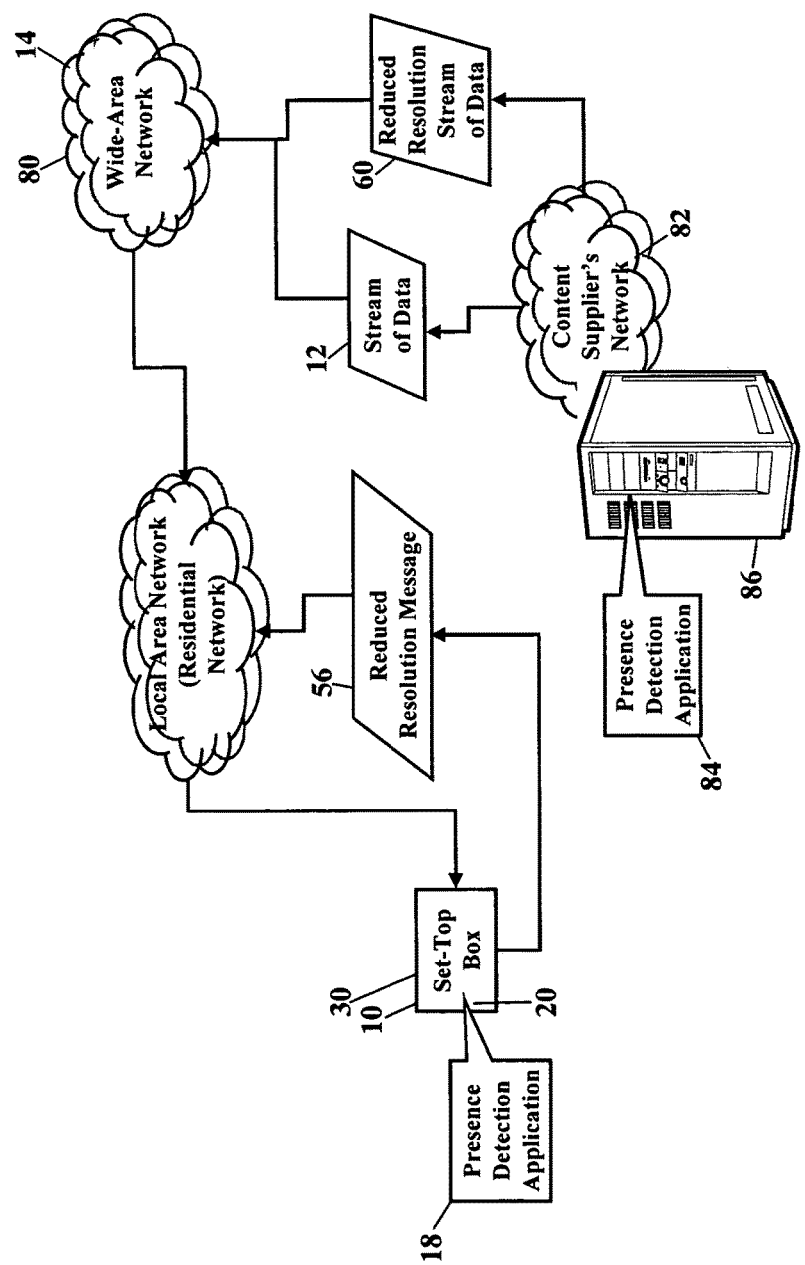
FIG. 10 is a schematic illustrating an alternative operating environment for the presence detection application 18, according to more exemplary embodiments.

FIG. 10 is a schematic illustrating an alternative operating environment for the presence detection application 18, according to more exemplary embodiments. Here the presence detection application 18 reduces bandwidth in a wide area network (WAN) 80 (such as the communications network 14) and may also reduce bandwidth in a content supplier's network 82. The presence detection application 18 entirely or partially stores within the memory 20 of the electronic device 10. A complimentary presence detection application 84 also operates within the content supplier's network 82 (such as within a content server 86). When the electronic device 10 detects or infers that the user is not present, the presence detection application 18 enters the low bandwidth state. The reduced resolution message 56 is sent from the electronic device 10 to the content supplier's network 82. The reduced resolution message 56 routes through the wide area network 80 and informs the content supplier's network 82 of the low bandwidth state.

Here the content supplier's network 82 reduces bandwidth. A device operating in the content supplier's network 82 (such as the content server 86) receives the reduced resolution message 56 and reduces the bit rate of the stream 12 of data. That is, the content supplier's network 82 may discard bits to reduce resolution. The content supplier's network 82, therefore, begins transmitting the reduced resolution stream 60 of data having a reduced resolution. The reduced resolution stream 60 of data routes through the wide area network 80 to the electronic device 10. This solution, then, reduces bandwidth in the wide area network 80 and may also reduce bandwidth in the content supplier's network 82.

Figure 11:
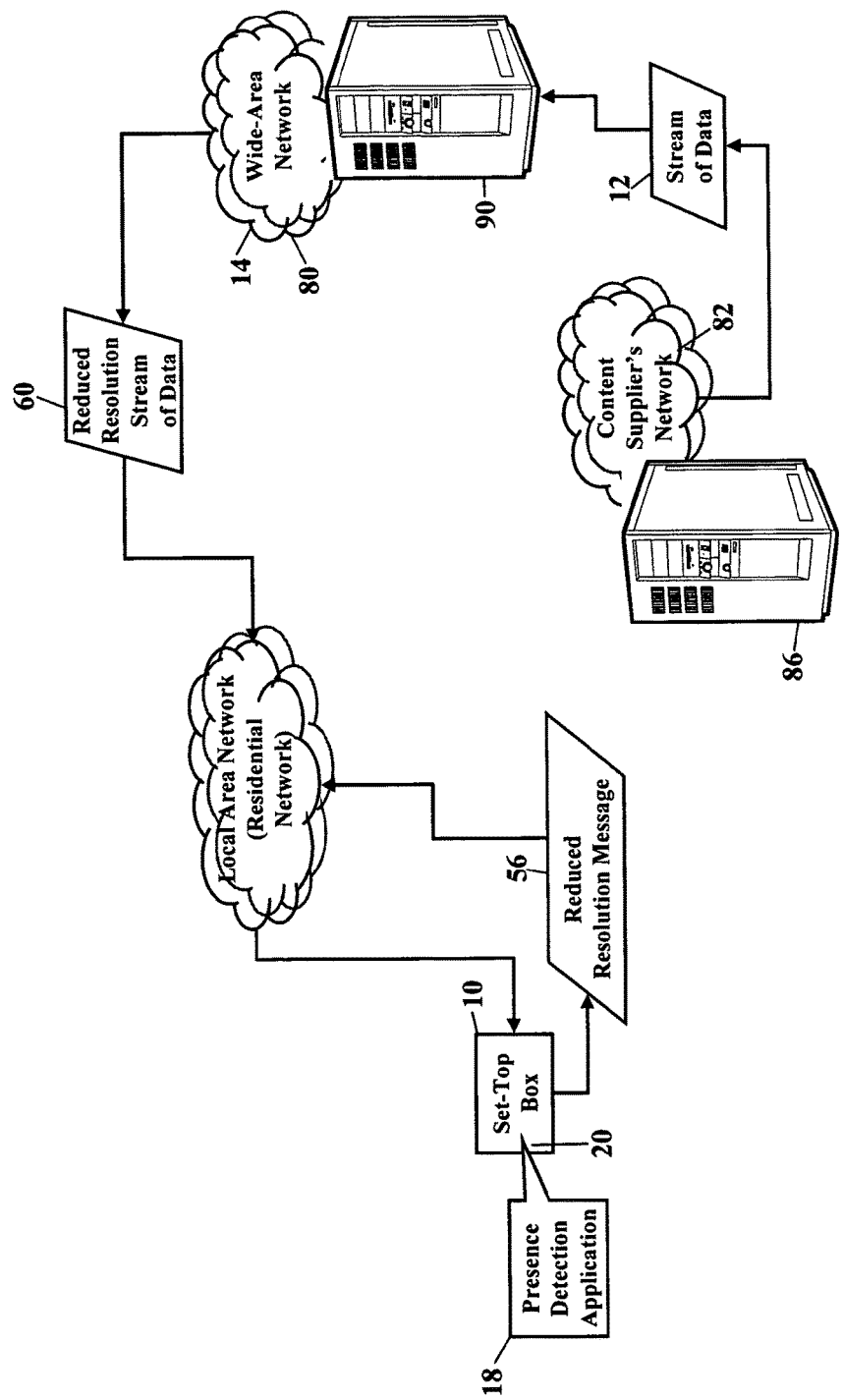
FIGS. 11-12 are schematics illustrating solutions for a broadband remote access server (BRAS), according to even more exemplary embodiments.

FIG. 11 is a schematic illustrating a solution for a broadband remote access server (BRAS) 90, according to even more exemplary embodiments. The broadband remote access server 90 sets policies for individual users and each user's allowance of bandwidth consumption. The broadband remote access server 90 also sets policies for individual sessions, regardless of the user. Here, when the presence detection application 18 infers that low-bandwidth is desired, a transaction is established with the broadband remote access server 90. When the electronic device 10 (such as the set-top box 30) detects or infers that the user is not present, the presence detection application 18 enters the low bandwidth state. The reduced resolution message 56 is sent from the set-top box 30 to the broadband remote access server 90. The reduced resolution message 56 routes through the wide area network 80 and informs the broadband remote access server 90 of the low-bandwidth state.

The broadband remote access server 90 may itself reduce bandwidth. When the broadband remote access server 90 receives the reduced resolution message 56, the broadband remote access server 90 itself reduces the bit rate of the stream 12 of data. That is, the broadband remote access server 90 receives the full resolution stream 12 of data and discards bits to reduce resolution. The broadband remote access server 90, therefore, begins transmitting the reduced resolution stream 60 of data having a reduced resolution. The reduced resolution stream 60 of data routes through the wide area network 80 to the electronic device 10. This solution reduces bandwidth in the wide area network 80, yet this solution fails to reduce bandwidth in the content supplier's network 82.

Figure 12:
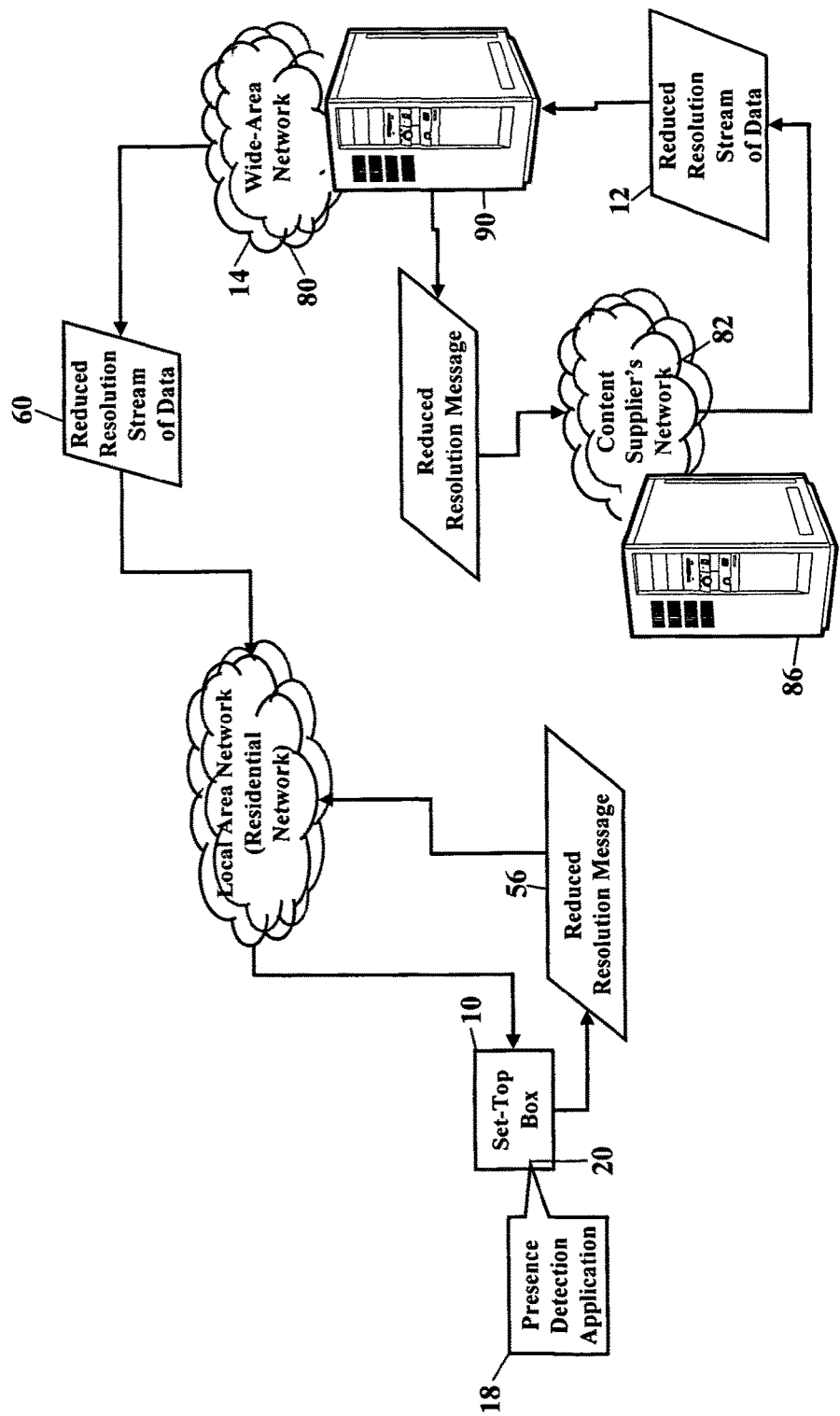

FIG. 12 is a schematic further illustrating the broadband remote access server (BRAS) 90, according to still more exemplary embodiments. FIG. 12 is similar to FIG. 11, although here the content supplier's network 82 is instructed to reduce the resolution of the stream 12 of data. When the electronic device 10 (such as the set-top box 30) detects or infers that the user is not present, the presence detection application 18 enters the low bandwidth state. The reduced resolution message 56, as before, routes from the electronic device 10, through the wide area network 80, and to the broadband remote access server 90. The reduced resolution message 56 informs the broadband remote access server 90 of the low-bandwidth state.

The broadband remote access server 90 then instructs the content supplier to reduce the bit rate of the session. The broadband remote access server 90 sends a message to the content supplier's network 82. The message is received by some controller (such as the content server 86). The content server 86 then discards bits from the stream of data (shown as reference numeral 12 in FIG. 10). The message from the broadband remote access server 90 may simply be a forwarded version of the reduced resolution message 56, as FIG. 12 illustrates. The message from the broadband remote access server 90, however, may take any form and have any protocol. Whatever the form, the message instructs or informs the content server 86 of the low-bandwidth need. The reduced resolution stream 60 of data, having a reduced resolution, routes through the wide area network 80 to the electronic device 10. This solution, then, reduces bandwidth in both the wide area network 80 and in the content supplier's network 82.

Figure 13:
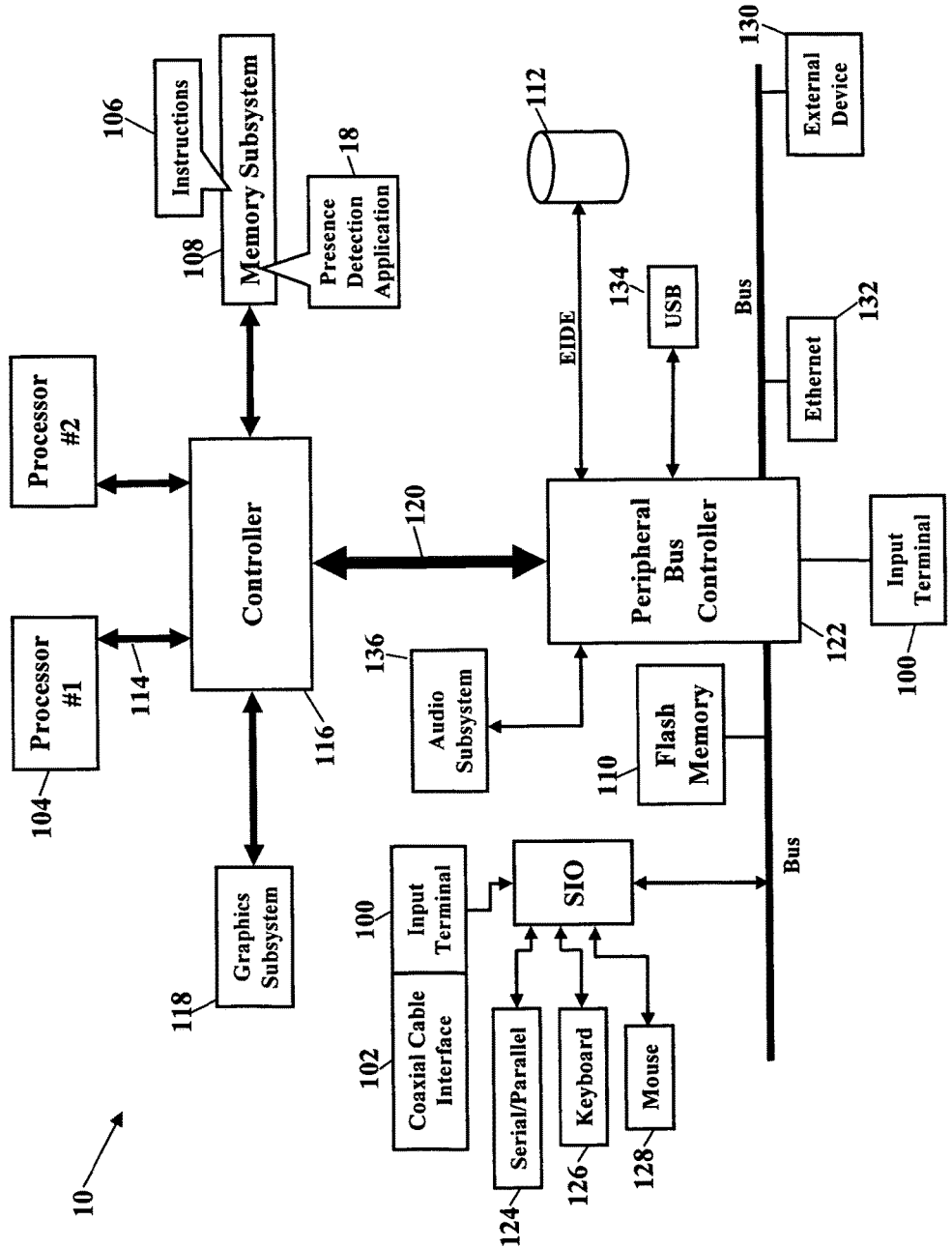
FIG. 13 is a schematic illustrating various types of electronic devices, according to exemplary embodiments.

FIG. 13 is a block diagram of exemplary details of the electrical device 10 shown in FIGS. 1-12. The electrical device 10 can be any device, such as an analog/digital recorder, television, CD/DVD player/recorder, audio equipment, receiver, tuner, and/or any other consumer electronic device. The electrical device 10 may also include any computer, peripheral device, camera, modem, storage device, telephone, personal digital assistant, and/or mobile phone. The electrical device 10 may also be configured as a set-top box ("STB") receiver that receives and decodes digital signals. The electrical device 10, in fact, can be any electronic/electrical device that has an input 100 for receiving the stream of data (shown as reference numeral 12 in FIGS. 1-11). The input 100 may include a coaxial cable interface 102 for receiving signals via a coaxial cable (not shown). The input 100 may additionally or alternatively include an interface to a fiber optic line, to a telephone line (such as an RJ-48/56), to other wiring, and to any male/female coupling. The input 100 may even include a wireless transceiver unit for wirelessly receiving transmitted signals.

The electrical device 10 includes one or more processors 104 executing instructions 106 stored in a system memory device. The instructions 106, for example, are shown residing in a memory subsystem 108. The instructions 106, however, could also reside in flash memory 110 or a peripheral storage device 112. When the processor 104 executes the instructions 106, the processor 104 may also consult the presence detection application 18 stored in the system memory device. The one or more processors 104 may also execute an operating system that controls the internal functions of the electrical device 10. A bus 114 may communicate signals, such as data signals, control signals, and address signals, between the processor 104 and a controller 116. The controller 116 provides a bridging function between the one or more processors 104, any graphics subsystem 118 (if desired), the memory subsystem 108, and, if needed, a peripheral bus 120. The peripheral bus 120 may be controlled by the controller 116, or the peripheral bus 90 may have a separate peripheral bus controller 122. The peripheral bus controller 122 serves as an input/output hub for various ports. These ports include the input terminal 100 and perhaps at least one output terminal. The ports may also include a serial and/or parallel port 124, a keyboard port 126, and a mouse port 128. The ports may also include one or more external device ports 130, networking ports 132 (such as Ethernet), and a USB port 134.

The electrical device 10 may also include an audio subsystem 136. The electrical device 10 may also include a display device (such as LED, LCD, plasma, or any other) to present instructions, messages, tutorials, and other information to a user. The electrical device 10 may further include one or more encoders, one or more decoders, input/output control, logic, one or more receivers/transmitters/transceivers, one or more clock generators, one or more Ethernet/LAN interfaces, one or more analog-to-digital converters, one or more digital-to-analog converters, one or more "Firewire" interfaces, one or more modem interfaces, and/or one or more PCMCIA interfaces. Those of ordinary skill in the art understand that the program, processes, methods, and systems described herein are not limited to any particular architecture or hardware.

The processors 104 may be implemented with a digital signal processor (DSP) and/or a microprocessor. Advanced Micro Devices, Inc., for example, manufactures a full line of microprocessors (Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Texas Instruments offers a wide variety of digital signal processors (Texas Instruments, Incorporated, P.O. Box 660199, Dallas, Tex. 75266-0199, Phone: 972-995-2011, www.ti.com) as well as Motorola (Motorola, Incorporated, 1303 E. Algonquin Road, Schaumburg, Ill. 60196, Phone 847-576-5000, www.motorola.com). There are, in fact, many manufacturers and designers of digital signal processors, microprocessors, controllers, and other componentry that are described in this patent. Those of ordinary skill in the art understand that this componentry may be implemented using any suitable design, architecture, and manufacture. Those of ordinary skill in the art, then understand that the exemplary embodiments are not limited to any particular manufacturer's component, or architecture, or manufacture.

The memory (shown as memory subsystem 108, flash memory 110, or peripheral storage device 112) may also contain an application program. The application program cooperates with the operating system and with a video display device to provide a Graphical User Interface (GUI). The graphical user interface provides a convenient visual and/or audible interface with a user of the electrical device 10.

Figure 14:
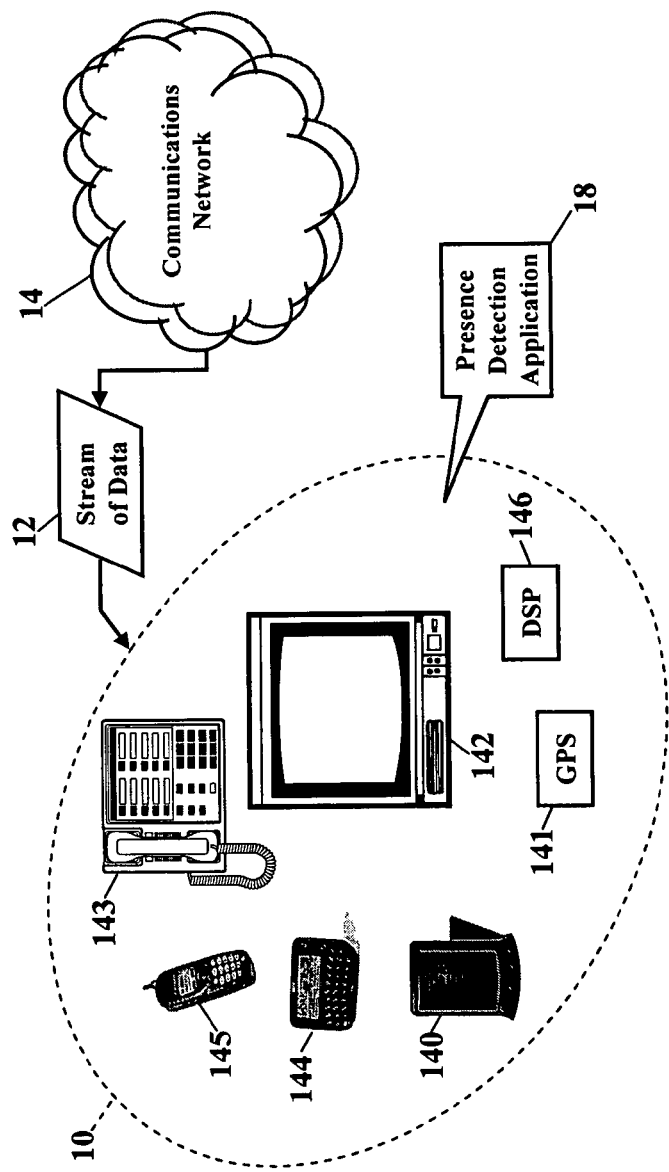
FIG. 14 is a schematic illustrating various types of multimedia devices, according to exemplary embodiments.

FIG. 14 is a schematic illustrating still more exemplary embodiments. FIG. 14 illustrates that the electronic device 10 may include various types of devices. The presence detection application 18 operates within any of these various types of devices. FIG. 14, for example, illustrates that the presence detection application 18 may entirely or partially operate within a personal digital assistant (PDA) 140, a Global Positioning System (GPS) device 141, an interactive television 142, an Internet Protocol (IP) phone 143, a pager 144, a cellular/satellite phone 145, or any computer system and/or communications device utilizing a digital signal processor (DSP) 146. The electronic device 10 may also include watches, radios, vehicle electronics, clocks, printers, gateways, and other apparatuses and systems.

Figure 15:
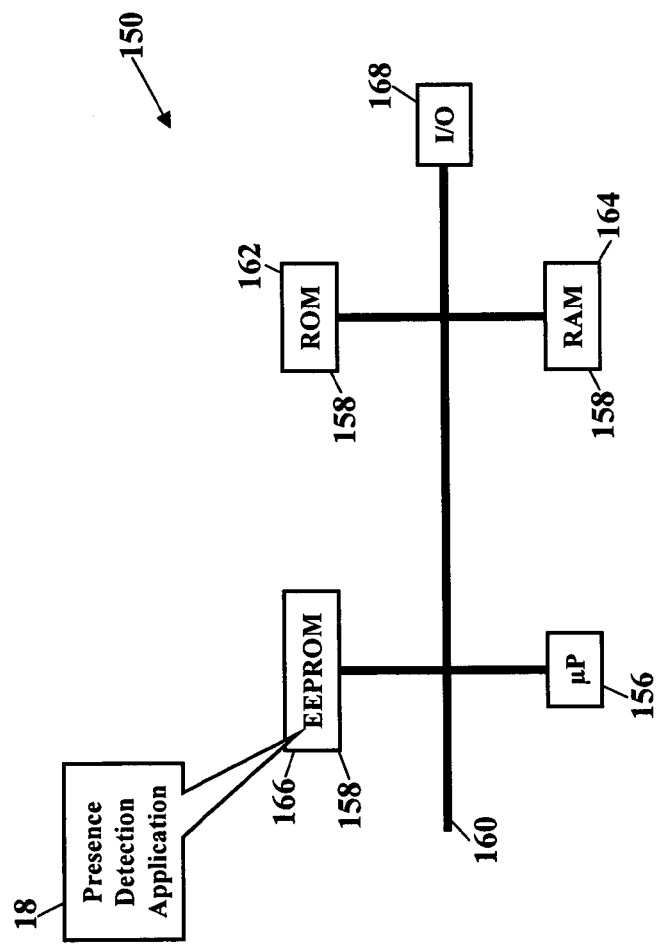
FIGS. 15-17 are schematics further illustrating the electronic device storing the presence detection application, according to exemplary embodiments.
Figure 16:
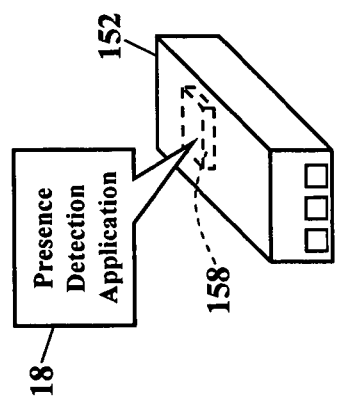
Figure 17:
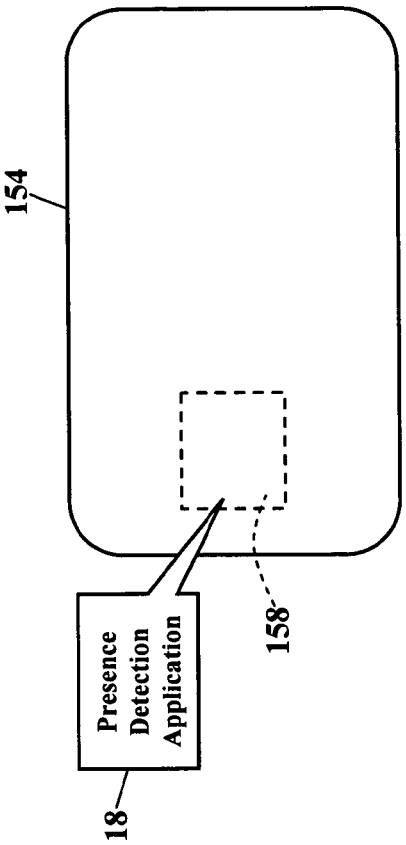

FIGS. 15-17 are schematics further illustrating the electronic device 10 storing the presence detection application 18, according to exemplary embodiments. FIG. 15 is a block diagram of a Subscriber Identity Module 150, while FIGS. 16 and 17 illustrate, respectively, the Subscriber Identity Module 150 embodied in a plug 152 and the Subscriber Identity Module 150 embodied in a card 154. As those of ordinary skill in the art recognize, the Subscriber Identity Module 150 may be used in conjunction with many electronic devices (such as the electronic devices shown in FIG.

14). The Subscriber Identity Module 150 stores user information (such as the user's International Mobile Subscriber Identity, the user's K; number, and other user information) and any portion of the presence detection application 18. As those of ordinary skill in the art also recognize, the plug 152 and the card 154 each interface with the communications device according to GSM Standards 2.17 and 11.11 and ISO Standard 7816, with each incorporated herein by reference. The GSM Standard 2.17 is formally known as "European digital cellular telecommunications system (Phase 1); Subscriber Identity Modules, Functional Characteristics (GSM 02.17 V3.2.0 (1995-01))." The GSM Standard 11.11 is formally known as "Digital cellular telecommunications system (Phase 2+) (GSM); Specification of the Subscriber Identity Module—Mobile Equipment (Subscriber Identity Module—ME) interface (GSM 11.11 V5.3.0 (1996-07))." Both GSM standards are available from the European Telecommunication Standards Institute (650 route des Lucioles, 06921 Sophia-Antipolis Cedex, FRANCE, Tel.: +33 (0)4 92 94 42 00, Fax: +33 (0)4 93 65 47 16, www.etsi.org). The ISO Standard 7816 is formally known as "Information technology—Identification cards—Integrated circuit(s) cards with contacts," and the standard is available from the International Organization for Standardization (ISO) (1, rue de Varembe, Case, postale 56CH-1211 Geneva 20, Switzerland, Telephone +41 22 749 01 11, Telefax +41 22 733 34 30, www.iso.org).

FIG. 15 is a block diagram of the Subscriber Identity Module 150, whether embodied as the plug 152 of FIG. 16 or as the card 154 of FIG. 17. Here the Subscriber Identity Module 150 comprises a microprocessor 156 communicating with memory modules 158 via a data bus 160. The memory modules may include Read Only Memory (ROM) 162, Random Access Memory (RAM) and or flash memory 164, and Electrically Erasable-Programmable Read Only Memory (EEPROM) 166. The Subscriber Identity Module 150 stores some or all of the presence detection application 18 in one or more of the memory modules 158. FIG. 15 shows the presence detection application 18 residing in the Erasable-Programmable Read Only Memory 166, yet the presence detection application 18 could alternatively or additionally reside in the Read Only Memory 162 and/or the Random Access/Flash Memory 164. An Input/Output module 168 handles communication between the Subscriber Identity Module 150 and the electronic device. As those skilled in the art will appreciate, there are many suitable ways for implementing the operation and physical/memory structure of the Subscriber Identity Module. If, however, the reader desires more information on the Subscriber Identity Module, the reader is directed to the following sources: LAWRENCE HARTE et al., GSM SUPERPHONES 99-100, 113-14 (1999); SIEGMUND REDL et al., GSM AND PERSONAL COMMUNICATIONS HANDBOOK 303-69 (1998); and JOACHIM TISAL, GSM CELLULAR RADIO TELEPHONY 99-130 (1997), with each incorporated herein by reference.

Figure 18:
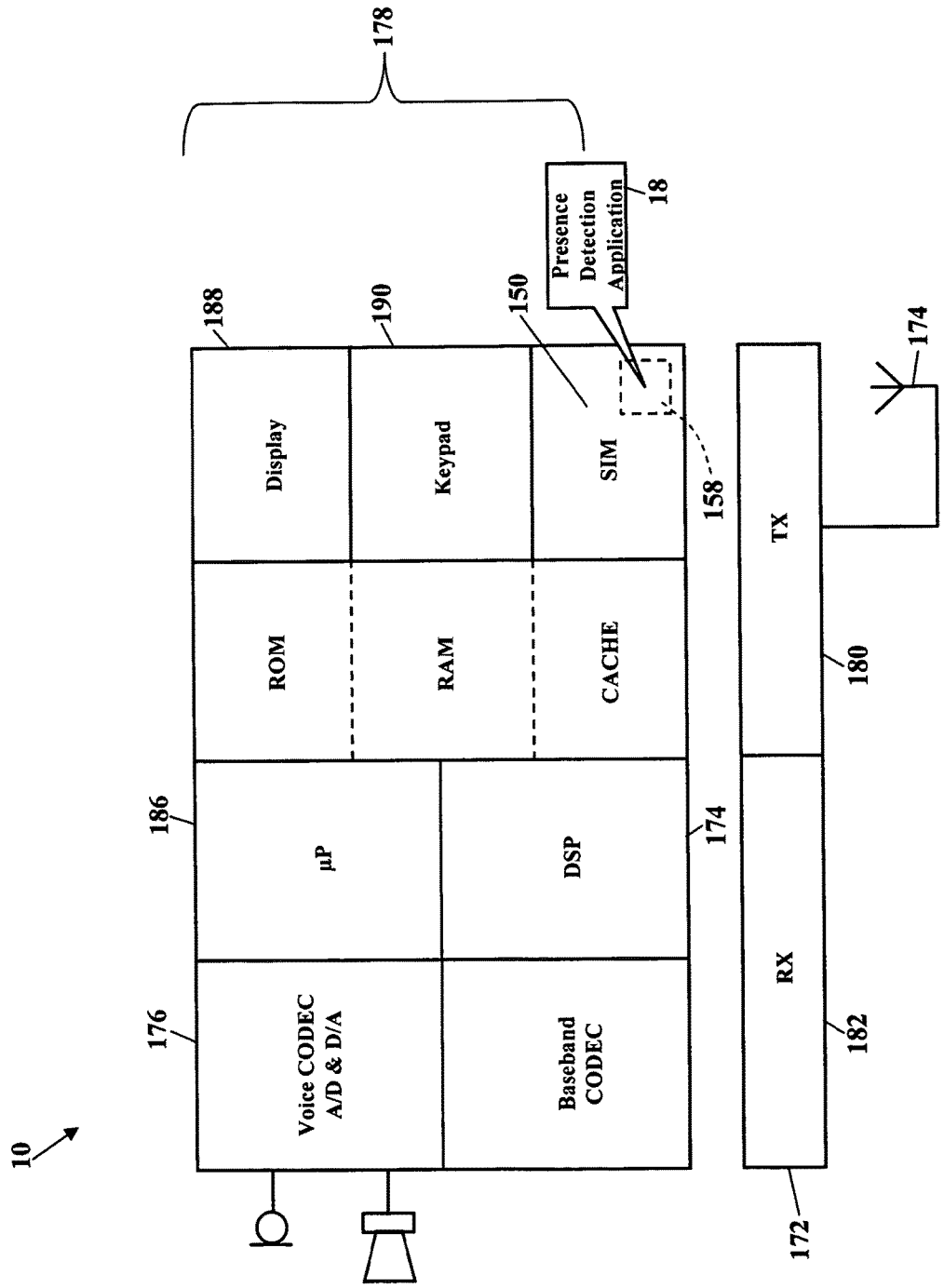
FIG. 18 is a schematic further illustrating the electronic device, according to exemplary embodiments.

FIG. 18 is a schematic further illustrating the electronic device 10, according to exemplary embodiments. FIG. 18 is an alternative block diagram of the electronic device 10 storing the presence detection application 18. Here the electronic device 10 comprises a radio transceiver unit 172, an antenna 174, a digital baseband chipset 176, and a man/machine interface (MMI) 178. The transceiver unit 172 includes transmitter circuitry 180 and receiver circuitry 182 for receiving and transmitting signals. The transceiver unit 172 couples to the antenna 174 for converting electrical current to and from electromagnetic waves. The digital baseband chipset 176 contains a digital signal processor (DSP) 184 and performs signal processing functions for audio (voice) signals and RF signals. As FIG. 14 shows, the digital baseband chipset 176 may also include an on-board microprocessor 186 that interacts with the man/machine interface (MMI) 178. The man/machine interface (MMI) 178 may comprise a display device 188, a keypad 190, and the Subscriber Identity Module 150.

The on-board microprocessor 186 performs GSM protocol functions and control functions for the radio circuitry 180 and 182, for the display device 188, and for the keypad 190. The on-board microprocessor 186 may also interface with the Subscriber Identity Module 150 and with the presence detection application 18 residing in the memory module 158 of the Subscriber Identity Module 150. Those skilled in the art will appreciate that there may be many suitable architectural configurations for the elements of the electronic device 10. If the reader desires a more detailed explanation, the reader is invited to consult the following sources: LAWRENCE HARTE et al., GSM SUPERPHONES 105-120 (1999); SIEGMUND REDL et al., GSM AND PERSONAL COMMUNICATIONS HANDBOOK 389-474 (1998); and JOACHIM TISAL, GSM CELLULAR RADIO TELEPHONY 99-130 (1997), with each incorporated herein by reference.

The presence detection application 18 may be utilized regardless of signaling standard. As those of ordinary skill in the art recognize, FIGS. 15-18 illustrate the electronic device 10 utilizing a Global System for Mobile (GSM) standard. That is, the electronic device 10 utilizes the Global System for Mobile (GSM) communications signaling standard. Those of ordinary skill in the art, however, also recognize that the presence detection application 18 may be utilized with the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard.

Figure 19:
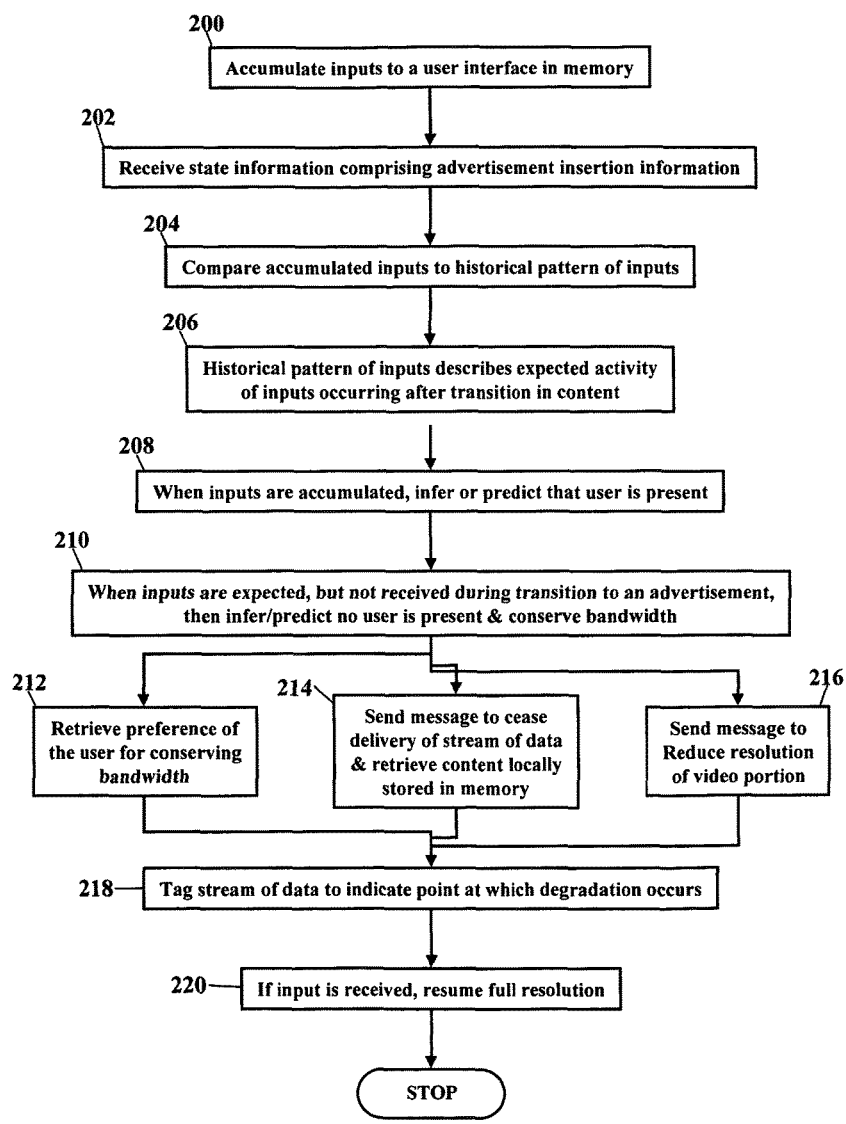
FIG. 19 is a flowchart illustrating a method of conserving bandwidth, according to more exemplary embodiments.

FIG. 19 is a flowchart illustrating a method of conserving bandwidth, according to exemplary embodiments. Inputs to a user interface are accumulated in memory (Block 200). State information is received, and the state information comprises advertisement insertion information (Block 202). The accumulated inputs are compared to a historical pattern of inputs (Block 204). The historical pattern of inputs describes an expected activity of inputs occurring after a transition in content (Block 206). When inputs are accumulated, the method predicts that a user is present (Block 208). When inputs are expected, but no inputs are received during transition to an advertisement, then the method predicts that no user is present and conserves bandwidth (Block 210). A preference of the user may be retrieved for conserving bandwidth (Block 212). A message may be sent that ceases delivery of a stream of data and retrieves content locally stored in memory (Block 214). A message may additionally or alternatively be sent that reduces resolution of a video portion of a received stream of data (Block 216). A stream of data may be tagged to indicate a point at which the stream was degraded to conserve bandwidth (Block 218). If an input is received after bandwidth is conserved, then full resolution of a stream of d ta is resumed (Block 220).

The presence detection application 18 may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the embodiments, allow the presence detection application 18 to be easily disseminated. A computer program product for conserving bandwidth comprises the computer-readable medium, and the presence detection application stores on the computer-readable medium. The presence detection application comprises computer code for detecting, inferring, and/or predicting the physical presence of a user. If the physical presence of the user is determined, then a full-resolution stream of data is delivered to an electrical device. If, however, the physical presence of the user cannot be detected, inferred, or predicted, then the resolution of the stream of data is reduced, or the stream is even terminated, to conserve bandwidth.

The presence detection application 18 may also be physically embodied on or in any addressable (e.g., HTTP, IEEE 802.11, Wireless Application Protocol (WAP)) wire line or wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method, comprising:
    monitoring, via a processor over a period of time, program state information for content streamed to an electronic device;
    accumulating, in a memory device via the processor, inputs received over the period of time from a user of the electronic device, each of the inputs correlated to the program state information based on a location in the content at which the corresponding input occurred;
    identifying patterns of user behavior based on collective correlations between the inputs and the program state information;
    determining, from the patterns, a presence or absence of the user at the electronic device with respect to currently streamed content, the determining comprising identifying a first pattern of user behavior in which no input is received from the user, and the location in the content indicates the currently streamed content is commercial-free content, and determining from the first pattern of user behavior that a next input from the user is not expected for a duration of the commercial-free content; and
    performing a bandwidth control operation with respect to the currently streamed content based on the determining, wherein upon determining the user is not present at the electronic device, the bandwidth control operation includes reducing a current allocation of bandwidth to the electronic device.

2. The method of claim 1, wherein upon determining the user is present at the electronic device, the bandwidth control operation includes maintaining a current allocation of bandwidth to the electronic device.

3. The method of claim 1, wherein upon determining the user is not present at the electronic device, transmitting a prompt to the electronic device notifying the user that a bandwidth reduction operation will be implemented for the electronic device unless an input is received from the user.

4. The method of claim 1, wherein the location in the content indicates an advertisement insertion slot.

5. The method of claim 1, wherein the location in the content is a time indicator reflecting a point in time ranging from a program beginning to a program ending.

6. The method of claim 1, further comprising:
    monitoring, over the period of time, program control information for each program of the content streamed to the electronic device, wherein each of the inputs is correlated to the program control information, the program control information including a channel of the program, a title of the program, and a duration of the program; and
    identifying patterns of user behavior based on collective correlations between the inputs and the program control information;
    wherein the patterns of user behavior based on collective correlations between the inputs and the program control information are used to further determine the presence or absence of the user at the electronic device.

7. A device, comprising:
    a memory comprising computer-executable instructions; and
    a processor executing the computer-executable instructions, the computer-executable instructions when executed by the processor cause the processor to perform operations comprising:
    monitoring, over a period of time, program state information for content streamed to an electronic device;
    accumulating, in the memory, inputs received over the period of time from a user of the electronic device, each of the inputs correlated to the program state information based on a location in the content at which the corresponding input occurred;
    identifying patterns of user behavior based on collective correlations between the inputs and the program state information;
    determining, from the patterns, a presence or absence of the user at the electronic device with respect to currently streamed content, the determining comprising identifying a first pattern of user behavior in which no input is received from the user, and the location in the content indicates the currently streamed content is commercial-free content, and determining from the first pattern of user behavior that a next input from the user is not expected for a duration of the commercial-free content; and
    performing a bandwidth control operation with respect to the currently streamed content based on the determining, wherein upon determining the user is not present at the electronic device, the bandwidth control operation includes reducing a current allocation of bandwidth to the electronic device.

8. The device of claim 7, wherein upon determining the user is present at the electronic device, the bandwidth control operation includes maintaining a current allocation of bandwidth to the electronic device.

9. The device of claim 7, wherein upon determining the user is not present at the electronic device, transmitting a prompt to the electronic device notifying the user that a bandwidth reduction operation will be implemented for the electronic device unless an input is received from the user.

10. The device of claim 7, wherein the location in the content indicates an advertisement insertion slot.

11. The device of claim 7, wherein the location in the content is a time indicator reflecting a point in time ranging from a program beginning to a program ending.

12. The device of claim 7, wherein the operations further include:
monitoring, over the period of time, program control information for each program of the content streamed to the electronic device, wherein each of the inputs is correlated to the program control information, the program control information including a channel of the program, a title of the program, and a duration of the program; and
identifying patterns of user behavior based on collective correlations between the inputs and the program control information;
wherein the patterns of user behavior based on collective correlations between the inputs and the program control information are used to further determine the presence or absence of the user at the electronic device.

13. A computer program product embodied on a non-transitory computer readable medium, the computer program product including instructions that, when executed by a computer, causes the computer to perform operations comprising:
monitoring, over a period of time, program state information for content streamed to an electronic device;
accumulating, in a memory device, inputs received over the period of time from a user of the electronic device, each of the inputs correlated to the program state information based on a location in the content at which the corresponding input occurred;
identifying patterns of user behavior based on collective correlations between the inputs and the program state information;
determining, from the patterns, a presence or absence of the user at the electronic device with respect to currently streamed content, the determining comprising identifying a first pattern of user behavior in which no input is received from the user, and the location in the content indicates the currently streamed content is commercial-free content, and determining from the first pattern of user behavior that a next input from the user is not expected for a duration of the commercial-free content; and
performing a bandwidth control operation with respect to the currently streamed content based on the determining, wherein upon determining the user is not present at the electronic device, the bandwidth control operation includes reducing a current allocation of bandwidth to the electronic device.

14. The computer program product of claim 13, wherein upon determining the user is present at the electronic device, the bandwidth control operation includes maintaining a current allocation of bandwidth to the electronic device.

15. The computer program product of claim 13, wherein upon determining the user is not present at the electronic device, transmitting a prompt to the electronic device notifying the user that a bandwidth reduction operation will be implemented for the electronic device unless an input is received from the user.

16. The computer program product of claim 13, wherein the location in the content indicates one of an advertisement insertion slot and a time indicator reflecting a point in time ranging from a program beginning to a program ending.

17. The computer program product of claim 13, wherein the operations further include:
monitoring, over the period of time, program control information for each program of the content streamed to the electronic device, wherein each of the inputs is correlated to the program control information, the program control information including a channel of the program, a title of the program, and a duration of the program; and
identifying patterns of user behavior based on collective correlations between the inputs and the program control information;
wherein the patterns of user behavior based on collective correlations between the inputs and the program control information are used to further determine the presence or absence of the user at the electronic device.

* * * * *